(12) United States Patent
Kashiwase

(10) Patent No.: US 8,194,703 B2
(45) Date of Patent: Jun. 5, 2012

(54) WIRELESS COMMUNICATION SYSTEM

(75) Inventor: Susumu Kashiwase, Yokohama (JP)

(73) Assignee: Kyocera Corporation, Takedatobadono-cho, Fushimi-ku, Kyoto-shi, Kyoto (JP)

( * ) Notice: Subject to any disclaimer, the term of this patent is extended or adjusted under 35 U.S.C. 154(b) by 933 days.

(21) Appl. No.: 10/635,867

(22) Filed: Aug. 6, 2003

(65) Prior Publication Data

US 2004/0029579 A1 Feb. 12, 2004

(30) Foreign Application Priority Data

Aug. 7, 2002 (JP) ................................ 2002-229658
Aug. 7, 2002 (JP) ................................ 2002-229659
Aug. 7, 2002 (JP) ................................ 2002-229660

(51) Int. Cl.
    *H04J 1/00* (2006.01)
(52) U.S. Cl. ........ 370/485; 370/310; 370/326; 370/328; 370/343
(58) Field of Classification Search .................. 370/310, 370/310.2, 314, 320–321, 326, 328, 335–336, 370/342–343, 445, 485; 455/560, 561, 426.1, 455/400, 61
    See application file for complete search history.

(56) References Cited

U.S. PATENT DOCUMENTS

| | | | | |
|---|---|---|---|---|
| 5,640,385 | A * | 6/1997 | Long et al. | 370/335 |
| 5,778,319 | A * | 7/1998 | Sawaki | 455/452.1 |
| 6,018,528 | A * | 1/2000 | Gitlin et al. | 370/436 |
| 6,178,330 | B1 * | 1/2001 | Alberty et al. | 455/452.2 |
| 6,282,184 | B1 * | 8/2001 | Lehman et al. | 370/342 |
| 6,504,833 | B1 * | 1/2003 | Ishii et al. | 370/342 |
| 6,563,806 | B1 * | 5/2003 | Yano et al. | 370/330 |
| 6,631,124 | B1 * | 10/2003 | Koorapaty et al. | 370/337 |
| 6,826,160 | B1 * | 11/2004 | Wang et al. | 370/329 |
| 6,973,064 | B2 * | 12/2005 | Terry et al. | 370/335 |
| 6,977,913 | B1 * | 12/2005 | Ishii et al. | 370/329 |
| 7,020,103 | B1 * | 3/2006 | Refai | 370/315 |

(Continued)

FOREIGN PATENT DOCUMENTS

EP    0 986 196 A1    3/2000

(Continued)

OTHER PUBLICATIONS

Japanese Office Action dated Oct. 17, 2006.

(Continued)

*Primary Examiner* — Kwang B Yao
*Assistant Examiner* — Nguyen Ngo
(74) *Attorney, Agent, or Firm* — John C. Garces; Schulte Roth & Zabel

(57) ABSTRACT

In a CDMA wireless communication system equipped with a base station, and at least one of wireless communication terminals which performs packet communications with respect to the base station by using at least one carrier, and wireless communication terminals which performs packet communications with respect to the base station by using a plurality of carriers at the same time. The base station includes: allocation information applying unit which applies allocation information which is commonly employed with respect to the plural carriers when a carrier is allocated to a specific terminal of the wireless communication terminals; time slot allocating unit which allocates time slots which are used by the wireless communication terminals in communications; allocation information storage unit which stores thereinto the allocation information; and time slot distribution determining unit which determines a time slot distribution which can be used by both the wireless communication terminals using one carrier, and also, the wireless communication terminals using the plural carriers at the same time.

46 Claims, 15 Drawing Sheets

U.S. PATENT DOCUMENTS

| | | | |
|---|---|---|---|
| 7,023,826 B2 * | 4/2006 | Sjoberg et al. | 370/338 |
| 7,133,379 B2 | 11/2006 | Yoshii et al. | |
| 2002/0191685 A1 * | 12/2002 | Sadowski | 375/224 |
| 2003/0058881 A1 * | 3/2003 | Wu et al. | 370/444 |
| 2003/0064753 A1 * | 4/2003 | Kasapi et al. | 455/561 |
| 2003/0123404 A1 * | 7/2003 | Kasapi et al. | 370/329 |

FOREIGN PATENT DOCUMENTS

| | | |
|---|---|---|
| JP | 04-134995 | 5/1992 |
| JP | 07-245778 | 9/1995 |
| JP | 11-331928 | 11/1999 |
| KR | 2001-12112 | 2/2001 |
| WO | WO 01/15481 A1 | 3/2001 |
| WO | WO 01/20817 A1 | 3/2001 |

OTHER PUBLICATIONS

Korean Office Action dated Jul. 29, 2006.

* cited by examiner

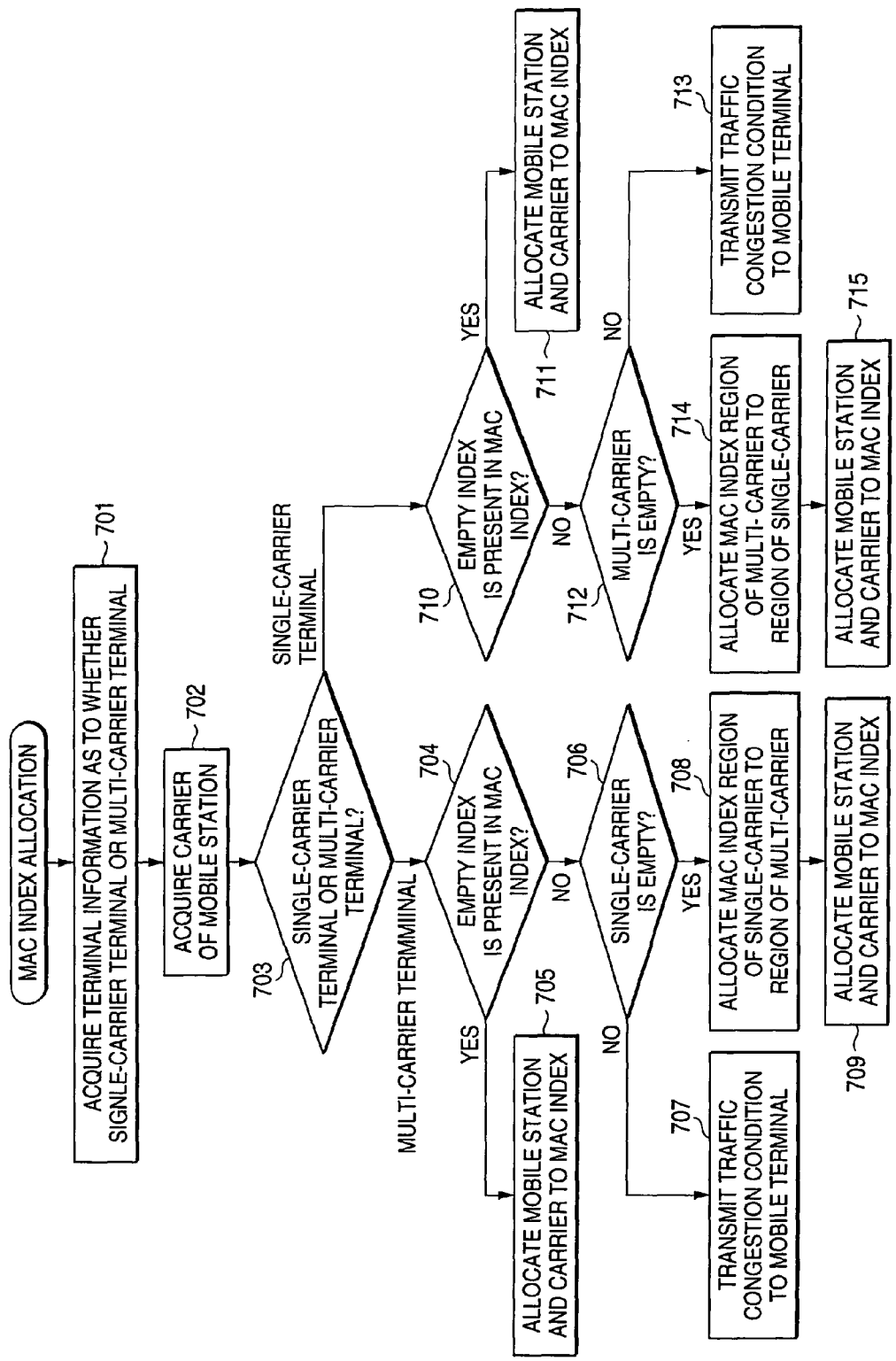

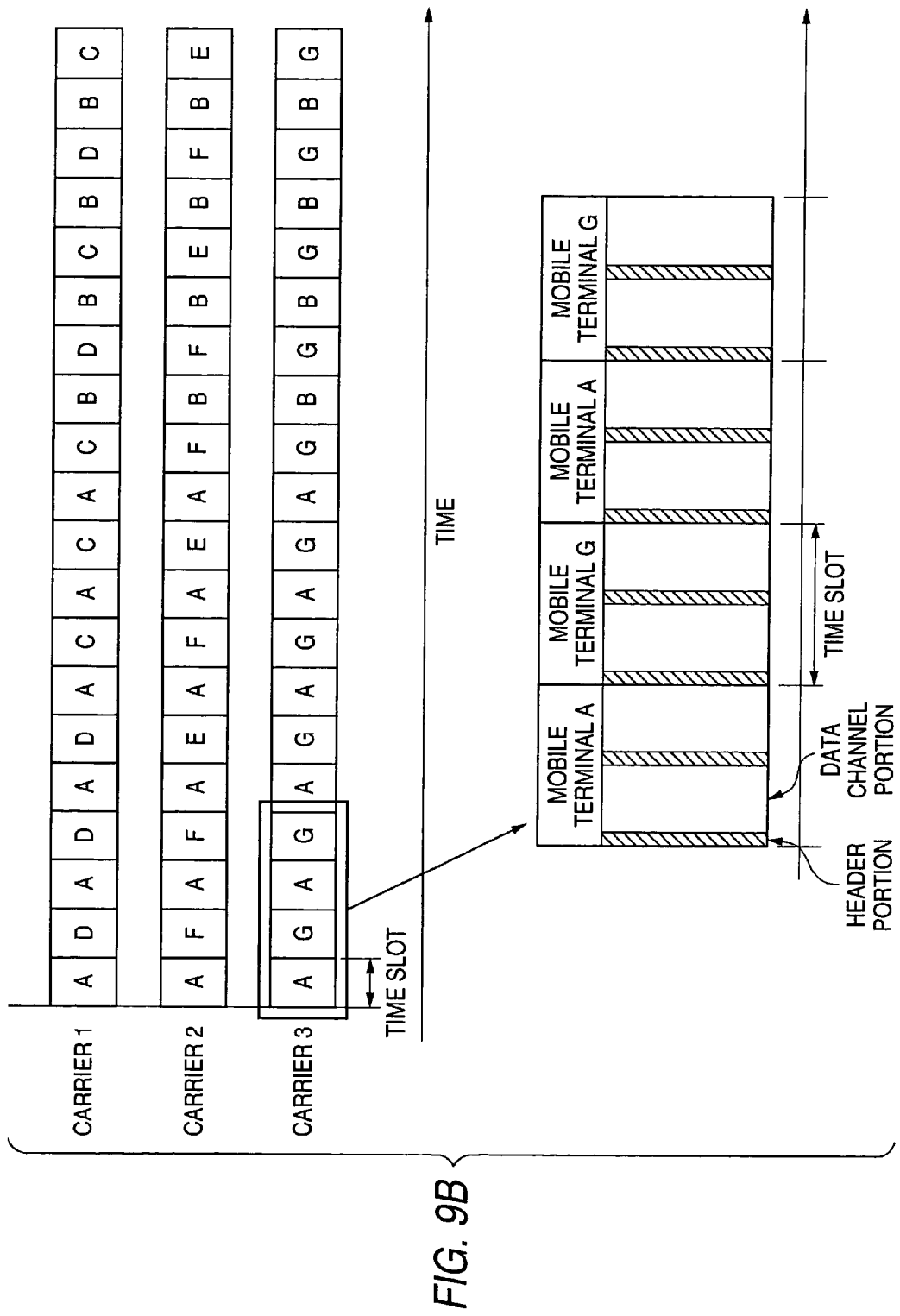

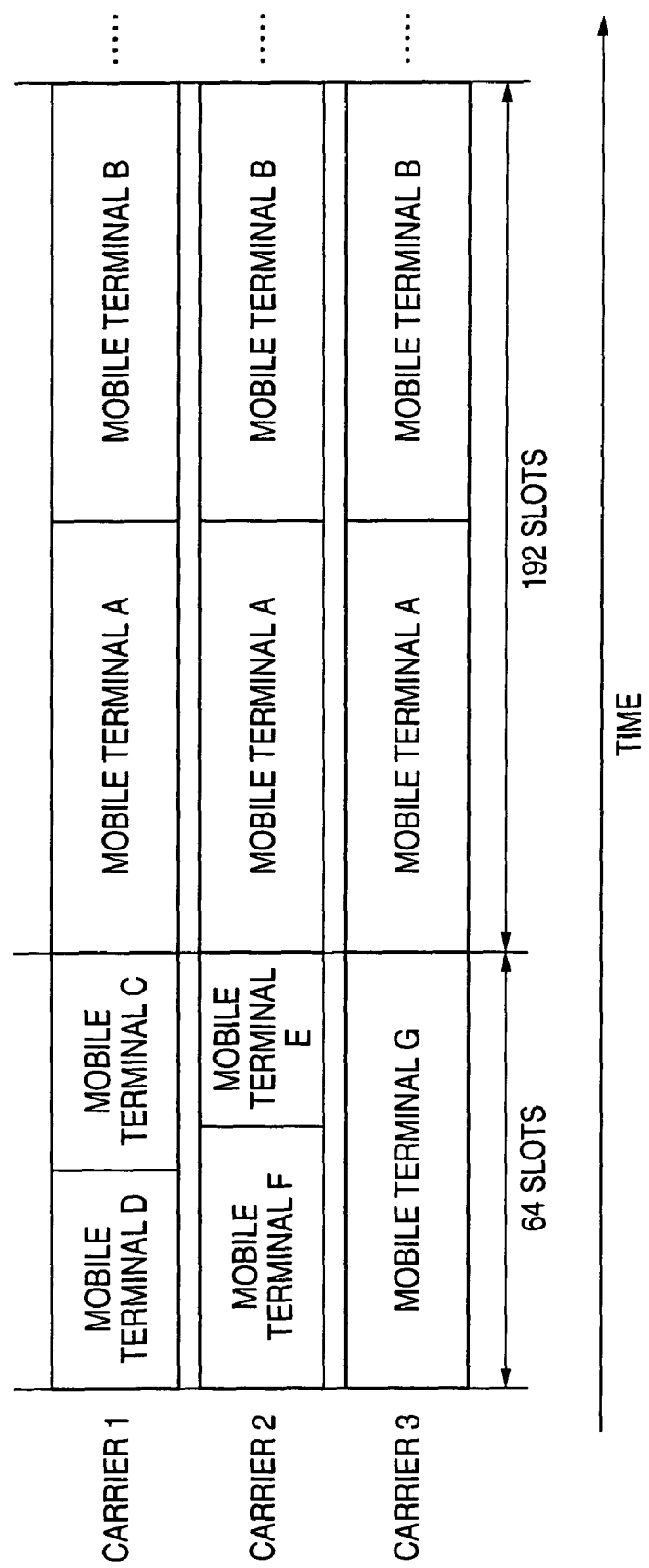

WIRELESS COMMUNICATION SYSTEM

CROSS-REFERENCE TO RELATED APPLICATIONS

This application claims priority from Japanese Patent Application No's. 2002-229658, 2002-229659 and 2002-229660 filed on Aug. 7, 2002.

BACKGROUND OF THE INVENTION

Field of the Invention

The present invention generally relates to a CDMA communication system capable of performing a packet communication. More specifically, the present invention is directed to such a wireless communication system capable of employing both a multi-carrier terminal and a single-carrier terminal.

As a CDMA wireless communication system capable of performing a forward-direction communication from a base station by way of a time division multiplex access (TDMA) method by a packet communication, for instance, the "HRPD" standard defined by C.S0024 is known which is published in 3GPP2 (http://www.3gpp2.org/). This technical standard "HRPD" corresponds to such a wireless communication technique of single-carrier terminals capable of performing packet communications through one set (namely, upstream and downstream) of frequency channels (carriers).

On the other hand, as a technique capable of performing a forward-direction packet communication from a base station by employing a code division multiplex access (CDMA) method, for example, "Spread Rate 3" (SR3) defined from C.S0001 to C.S0005 of the 3GPP2 standard is known. This technique corresponds to such a wireless communication technique of multi-carrier terminals capable of executing packet communications by employing a plurality of frequency channels at the same time, namely corresponds to a wireless communication technique capable of performing a packet communication at the chiprate of 3.6864 MHz by simultaneously using three carrieries (frequency channels) whose chiprate is 1.2288 MHz.

In the above-described multi-carrier terminals with employment of the SR3 technique, since one carrier may occupy one spread code which is used to execute the CDMA method, a plurality of spread codes are required within the same cell in response to a total number of multi-carrier terminals.

On the other hand, in the case that the conventional wireless communication system with employment of the single-carrier is changed into a wireless communication system with employment of multi-carrier, which may be predicted to be possibly popularized, if the existing accommodations can be expanded in order that both the single-carrier wireless communication technique and the multi-carrier wireless communication technique can coexist, and can be utilized at the same time, then this technical idea may become very effective in view of cost and expansion aspects.

According to the first aspect of the invention, a communication system comprises: a base station, and at least one of a wireless communication terminal for performing a packet communication with respect to the base station by using at least one carrier (for example, corresponds to one set (upstream/downstream) of frequency channel, and will be referred to as "single carrier"), and a wireless communication terminal for performing a packet communication with respect to the base station by using a plurality of carriers (for instance, one set (arranged by one, or more upstreams and two, or more downstreams) of frequency channels is combined with each other, and will be referred to as "multi-carrier") at the same time, in which the base station comprises: allocation information applying means for applying allocation information which is commonly employed with respect to the plural carriers when a carrier is allocated to a specific terminal of the wireless communication terminals; and allocation information storage means for storing thereinto the allocation information.

Further, a communication system comprises: a base station, a first wireless communication terminal for performing a packet communication with respect to the base station by using one carrier, and a second wireless communication terminal for performing a packet communication with respect to the base station by using a plurality of carriers at the same time, in which the base station comprises: allocation information applying means for applying allocation information which is commonly used for the plurality of carriers when the carriers are allocated to either the first wireless communication terminal or the second wireless communication terminal; and allocation information storage means for storing thereinto said allocation information.

Preferably, the communication system further comprises: time slot allocating means for allocating time slots which are used in packet communications by said first and second wireless communication terminals, the time slot allocating means allocates one wireless communication terminal among said first and second wireless communication terminals to one unit of a time slot distribution used by said first and second wireless communication terminals in the packet communications every said carrier.

Preferably, the communication system further comprises: time slot allocating means for allocating time slots which are used in packet communications by said first and second wireless communication terminals; and time slot distribution determining means for determining a time slot distribution which can be used by both said first wireless communication terminal and said second wireless communication terminal.

According to the second aspect of the invention, a base station apparatus for performing a packet communication with respect to both a first wireless communication terminal for performing a packet communication by using one carrier, and a second wireless communication terminal for performing a packet communication by using a plurality of carriers at the same time, the base station apparatus comprises: allocation information applying means for applying allocation information which is commonly used for said plurality of carriers when the carriers are allocated to either said first wireless communication terminal or said second wireless communication terminal; and allocation information storage means for storing thereinto said allocation information.

Preferably, the base station apparatus further comprises: time slot allocating means for allocating time slots which are used by the wireless communication terminals in packet communications, said time slot allocating means allocates one wireless communication terminal among said first and second wireless communication terminals to one unit of a time slot distribution used by said first and second wireless communication terminals in the packet communications every one carrier.

Preferably, the base station apparatus further comprises: time slot allocating means for allocating time slots which are used in packet communications by said first and second wireless communication terminals; and time slot distribution determining means for determining a time slot distribution which can be used by both said first wireless communication terminal and said second wireless communication terminal.

According to the third aspect of the invention, a wireless communication terminal for communicating with a base station apparatus which performs a packet communication with respect to both a wireless communication terminal for executing a packet communication by employing one carrier and also another wireless communication terminal for executing a packet communication by employing a plurality of carriers at the same time; and said base station apparatus comprising: allocation information applying means for applying allocation information which is commonly employed with respect to the plural carriers when carriers are allocated to specific wireless communication terminals; and allocation information storage means for storing thereinto the allocation information; wherein the wireless communication terminal judges a destination of a communication packet transmitted from said base station based upon said allocation information contained in a header of said transmitted packet so as to be communicated with said base station.

Further, a wireless communication terminal for communicating with a base station apparatus which performs a packet communication with respect to both a wireless communication terminal for executing a packet communication by employing one carrier and also another wireless communication terminal for executing packet communication by employing a plurality of carriers at the same time; and the base station apparatus comprising: allocation information applying means for applying allocation information which is commonly employed with respect to the plural carriers when the carriers are allocated to specific wireless communication terminals at the same time; time slot allocating means for allocating time slots which are used by the wireless communication terminals in packet communications; and allocation information storage means for storing thereinto the allocation information; in which said time slot allocating means allocates one wireless communication terminal among said first and second wireless communication terminals to one unit of a time slot distribution used by said first and second wireless communication terminals in the packet communications every one carrier; wherein the wireless communication terminal judges a destination of a communication packet transmitted from said base station based upon said allocation information contained in a header of said transmitted packet so as to be communicated with said base station.

Further, the wireless communication terminal for communicating with a base station apparatus which performs a packet communication with respect to both a wireless communication terminal for executing a packet communication by employing one carrier and also another wireless communication terminal for executing a packet communication by employing a plurality of carriers at the same time; and the base station apparatus comprising: allocation information applying means for applying allocation information which is commonly employed with respect to the plural carriers when a carrier is allocated to a specific terminal of said wireless communication terminals; time slot allocating means for allocating time slots which are used by the wireless communication terminals in packet communications; allocation information storage means for storing thereinto the allocation information; and time slot distribution determining means for determining a time slot distribution which can be used by both the wireless communication terminal using one carrier, and also, the wireless communication terminal using the plural carriers at the same time; wherein the wireless communication terminal judges a destination of a communication packet transmitted from said base station based upon said allocation information contained in a header of said transmitted packet so as to be communicated with said base station.

In accordance with the present invention, the allocation information applying means applies allocation information which is commonly used for the plurality of carriers when the plurality of carriers are allocated to the wireless communication terminal. Accordingly, the communication between the base and the wireless communication terminal is controlled on the basis of the allocation information (MAC index).

In accordance with the present invention, a wireless communication terminal which uses a plurality of carriers and a wireless commutation terminal which uses one carrier are controlled by allocation information. The allocation information can be stored so as not to overlap the wireless communication terminal which uses a plurality of carriers and a wireless commutation terminal which uses one carrier.

In accordance with the present invention, the allocation information applying means changes a boundary in the arrangement of the allocation information. Accordingly, the ratio of the first wireless communication terminal and the second wireless communication terminal is changed in accordance with the traffic condition of the communication line.

In accordance with the present invention, the wireless communication terminal determines the destination of the communication packets by the allocation information attached to the header of the communication packets which is transmitted from the base station, and communicates with the base station. Therefore, the communication is controlled by the allocation information (MAC index).

In accordance with the present invention, the time slot distribution may be determined between the wireless communication terminals which use one carrier and the wireless communication terminals which use the plural carriers in the base station.

In accordance with the present, the time slot distribution may be determined between the wireless communication terminals which use one carrier and the wireless communication terminals which use the plural carriers in the base station.

In accordance with the present invention, the time slot allocating means can allocate the times used in the packet communications based upon independent algorithms, so that the work load given to the time slot allocating process operation can be reduced.

In accordance with the present, the traffic amounts within the cell may be previously managed by the base station in the total manner.

In accordance with the present invention, the priority order of the packet communications can be dynamically determined in response to the conditions of the communication qualities as to the respective wireless communication terminals within the cell.

In accordance with the present invention, the priority order of the packet communications can be dynamically determined in response to the conditions of the communication qualities as to the respective wireless communication terminals within the cell.

In accordance with the present, the time slot distribution determining means allocates a large time slot distribution to such wireless communication terminals whose communication number is larger, so that the priority order of the packet communications can be increased in the dynamic manner.

According to the present invention, the time slot distribution may be determined between the wireless communication terminals which use one carrier and the wireless communication terminals which use the plural carriers in the base station.

In accordance with the present, the time slot distribution between the first wireless communication terminal and the second wireless communication terminal can be determined in the base station.

According to the present, the time slot distribution between the wireless communication terminals which use one carrier and the wireless communication terminals which use the plural carriers can be determined in the base station.

Also, the packet communication is carried out by using a variable length packet. As a result, the communication lines can be effectively utilized while useless packets are not produced as being permitted as possible.

BRIEF DESCRIPTION OF THE DRAWINGS

FIG. 7 is a flow chart for describing process operations executed when the base station allocates MAC indexes to the mobile station.

FIG. 9B is a schematic diagram for indicating a packet used in communications between the mobile station and the base station.

FIG. 10 is an allocation diagram for explaining such a case that a ratio of single-carrier terminals to multi-carrier terminals is set to 1:3.

DETAILED DESCRIPTION OF THE PREFERRED EMBODIMENTS

Referring now to drawings, a wireless communication system according to an embodiment of the present invention will be described in detail.

Figure 1:
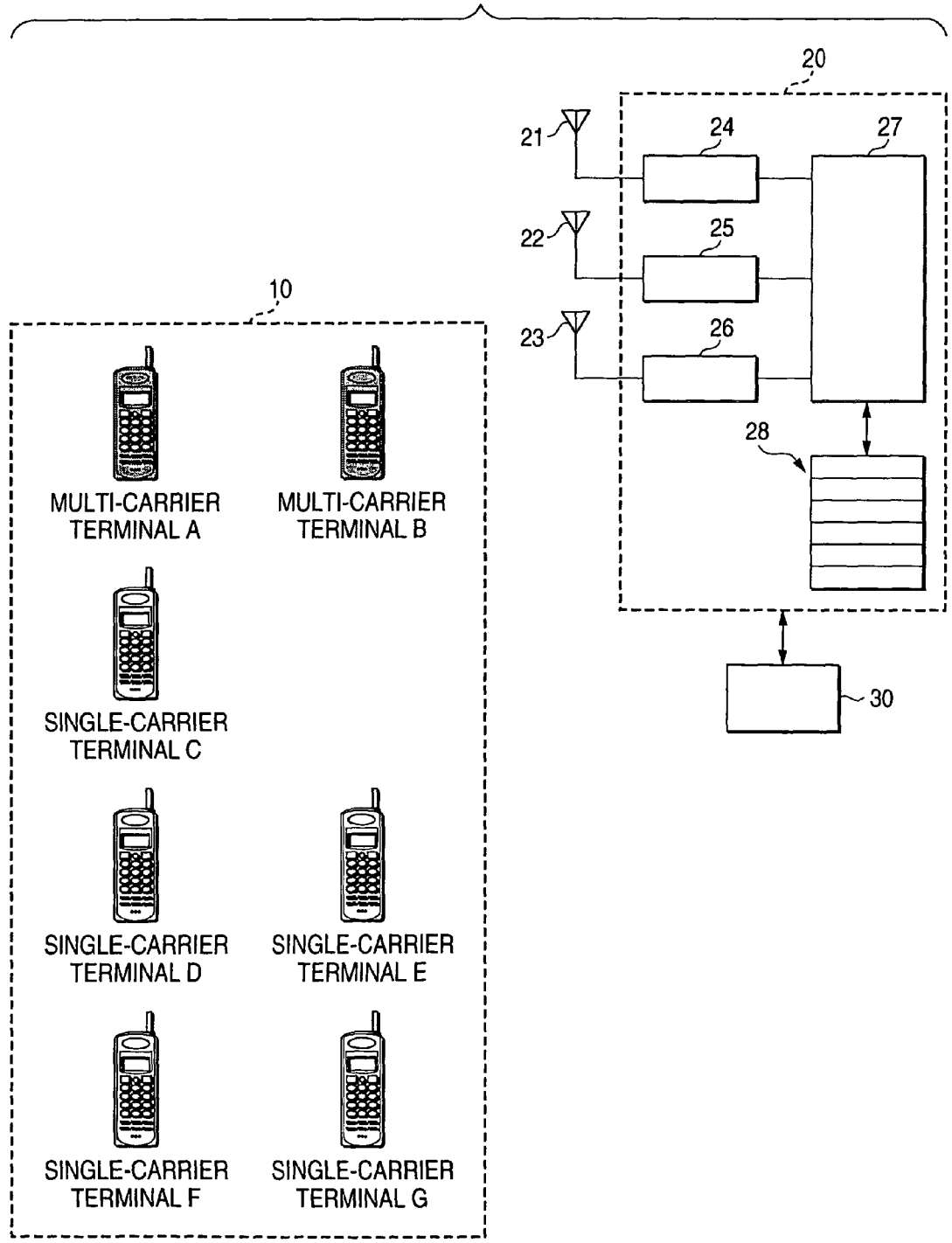
FIG. 1 is a schematic diagram for showing a communication system according to a first embodiment of the present invention.

FIG. 1 is a schematic diagram for showing a wireless communication system according to an embodiment of the present invention.

Reference numeral 10 shows a mobile station, reference numeral 20 indicates a base station, and reference numeral 30 represents a switching station.

The mobile station 10 contains one, or more portable communication terminals. Both a portable terminal "A" and another portable terminal "B" correspond to multi-carrier communication terminals, and while such a multi-carrier terminal uses three carriers at the same time, this multi-carrier terminal executes the code division multiple access (CDMA) system every one carrier so as to perform a packet communication from the base station 20 along a forward direction. A portable terminal "C", another portable terminal "D", another portable terminal "E", another portable terminal "F", and another portable terminal "G" correspond to single-carrier communication terminals, and while such a single-carrier terminal uses only one carrier, this single-carrier terminal executes the code division multiple access system so as to perform a packet communication from the base station 20 along the forward direction.

The base station 20 is equipped with antennas 21 to 23, wireless units 24 to 26, a control unit 27, and a storage unit 28. While the antennas 21 to 23 are connected to the respective wireless units 24 to 26, these antennas 21 to 23 receive electromagnetic waves transmitted from the mobile station 10, and also, transmit electromagnetic waves with respect to the mobile station 10. The wireless units 24 to 26 convert transmission data into high frequency signals which are transmitted from the antennas 21 to 23, and also, converts high frequency signals received from the antennas 21 to 23 into reception data. Both the antenna 21 and the wireless unit 24, both the antenna 22 and the wireless unit 25, both the antenna 23 and the wireless unit 26 are communicated with the mobile station 10 by using different carriers from each other. In other words, the base station 20 may execute a multi-carrier communication with respect to the mobile station 10 by transmitting/receiving a plurality of carriers at the same time. The control unit 27 controls the wireless units 24 to 26, and also, while the control unit 27 allocates MAC indexes (will be explained later) and stores the MAC indexes into the storage unit 28, this control unit 27 manages the mobile station 10.

The switching station 30 connects the base station 20 to either another base station or a broadband line so as to establish interconnections of communications between them.

Next, an outline of the wireless communication system according to the embodiment of the present invention will now be described.

In the wireless communication system of this embodiment, the base station 20 is capable of transmitting/receiving three carriers at the same time, and both the mobile station 10 and the base station 20 are capable of performing wireless communications at the same time by employing these three carriers. Within the mobile station 10, a single-carrier terminal is capable of wireless-communicating with the base station 20 by using any one of these three carriers, whereas a multi-carrier terminal is capable of wireless-communicating with the base station 20 by utilizing these three carriers at the same time. At this time, the time division multiple access (TDMA) system is carried out in each of these three carriers, time slots are set within a single carrier, and then, data is divided every time slot so as to execute a wireless communication (packet communication). It should be understood that a dimension of this time slot may be a fixed length, or may be a variable length in response to a data amount and/or a sort of data.

Furthermore, when both the base station 20 and the mobile station 10 perform a communication, communication data contained in each of the time slots is processed in a CDMA manner to perform a CDMA communication.

When the mobile station 10 and the base station 20 perform a communication, the base station 20 manages carriers and time slots, which are used by the mobile station 10, based upon "MAC index".

Figure 2:
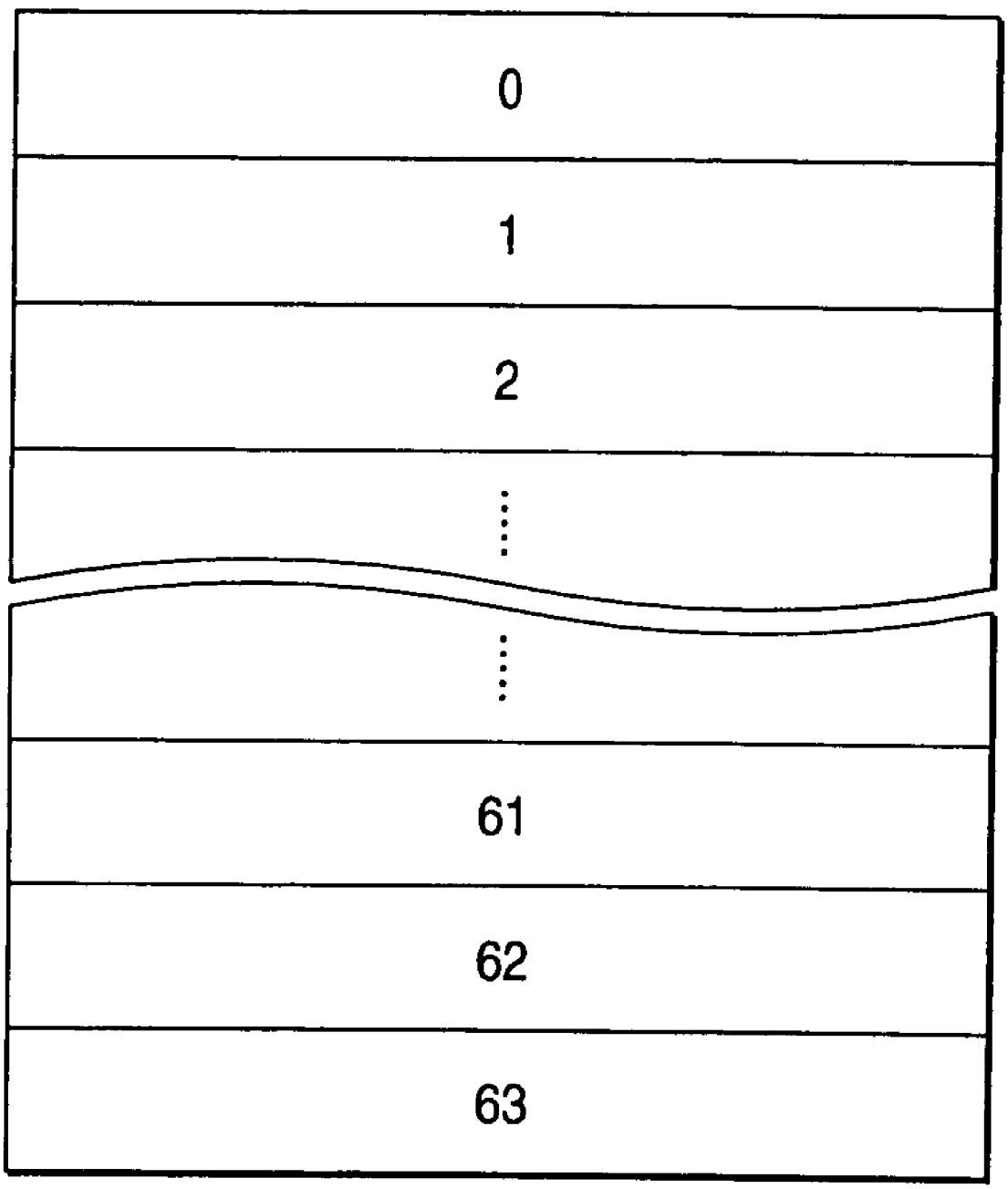
FIG. 2 is a schematic diagram for indicating an MAC index.

FIG. 2 is an explanatory diagram for explaining this MAC index.

The MAC index of this embodiment corresponds to a 6-bit code map which is constituted by 64 sorts of codes (namely, 0 to 63 in decimal notation). As to these 64 sorts of codes (MAC indexes), both carriers used by the respective terminals and usable time slots are allocated to the respective terminals involved in the mobile station 10 respectively in the base station 20.

Figure 3:
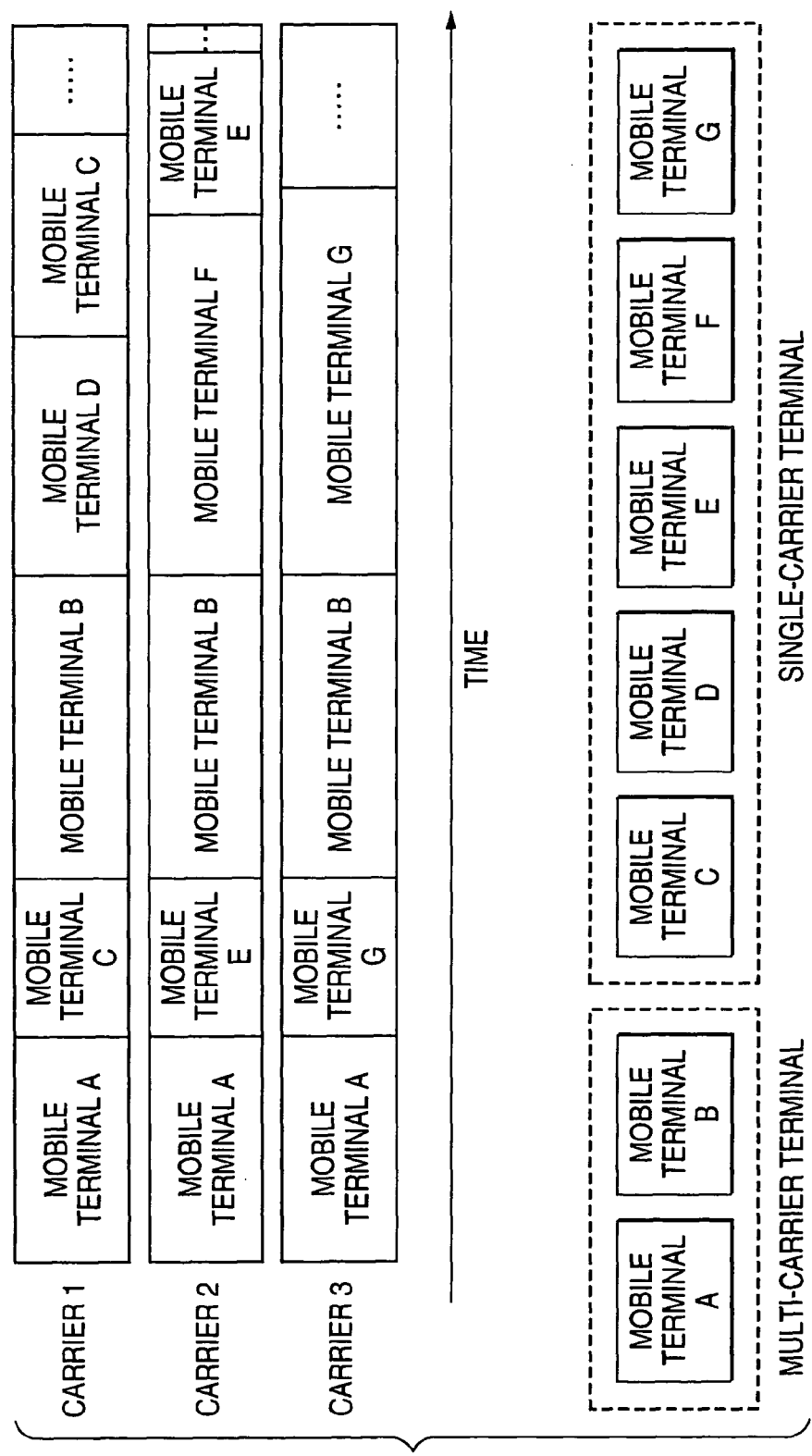
FIG. 3 is a schematic diagram for representing allocations of carriers to mobile stations.

FIG. 3 is a schematic diagram for schematically showing an allocation of carriers and time slots in the case that both the mobile station 10 and the base station 20 execute a packet communication.

A multi-carrier terminal (either wireless terminal "A" or wireless terminal "B") performs a wireless communication by simultaneously using a plurality of time slots (namely, three time slots in this embodiment) within a plurality of allocated carriers (namely, three carriers in this embodiment). Since a single-carrier terminal (wireless terminals "C" to "G") performs a packet communication by using only one carrier, this single-carrier terminal uses only one time slot of one carrier at the same time, so that three sets of single-carrier terminals may simultaneously execute packet communications in the same time within different carriers from each other.

Next, a description will now be made of packet communication operations executed by the mobile station 20 in such a way that while the MAC indexes are utilized, this base station 20 allocates carriers and time slots with respect to wireless terminals so as to perform a packet communication.

Figure 4:
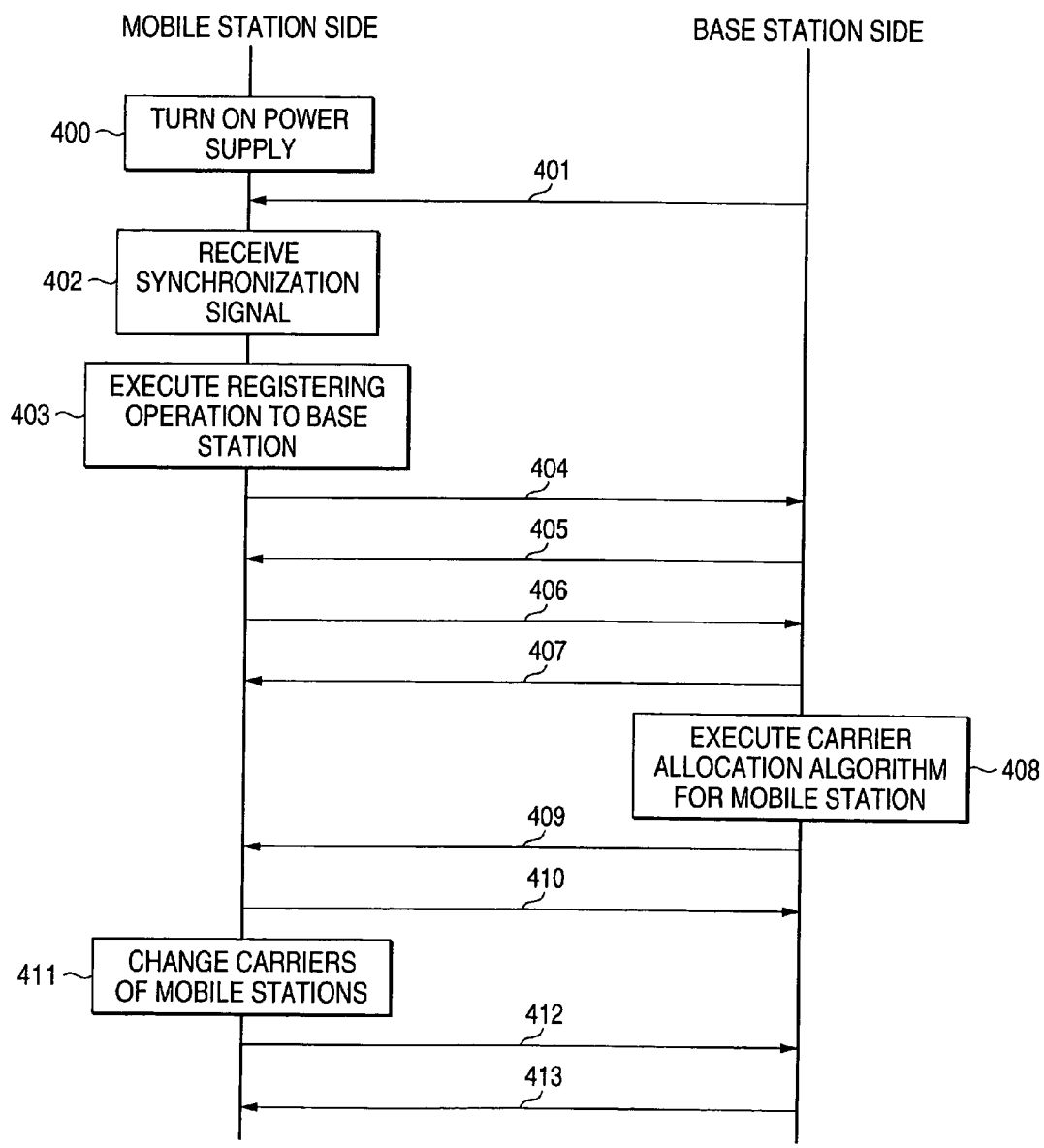
FIG. 4 is a sequence diagram for indicating operations of allocating carriers between a mobile station and a base station.

First, a description is made of operations executed in the case that the base station 20 allocates carriers with respect to the mobile station 10 (wireless terminals) with reference to FIG. 4.

The base station 20 continuously transmits a synchronization signal with respect to the mobile station 10 (process 401).

When a power supply of the mobile station 10 is turned ON and this mobile station 10 receives the synchronization signal transmitted from the base station (process 402), the mobile station 10 executes a registering operation process indicated from a process 404 up to a process 413 with respect to the base station 20 (process 403).

In this registering operation, the mobile station 10 must be registered in the control unit 27 of the base station 20 in order to perform a packet communication with respect to the base station 20. The mobile station 10 transmits a registering-operation-start request message to the base station 20 in order to perform this registering operation, and thus, requests the control unit 27 of the base station 20 to be registered thereinto (process 404). When the base station 20 receives this request message, the base station 20 recognizes existence (presence) of the mobile station 10. At the same time, the base station 20 returns a registering-operation-start-permission message to the mobile station 10, while this registering-operation-start-permission message is employed to confirm the commencement of the registering operation (process 405).

When the mobile station 10 receives this permission message, this mobile station (wireless terminal) 10 transmits functional information to the base station 20 so as to request such a carrier allocation suitable for the function of the wireless terminal (process 406). This functional information indicates as to whether the own wireless terminal corresponds to a single-carrier terminal, or a multi-carrier terminal. The base station 20 receives this functional information so as to recognize that this mobile station 10 corresponds to either the single-carrier terminal or the multi-carrier terminal, and then, stores the functional information of the mobile station 10 into the storage unit 28. When this functional information is stored in the storage unit 28, the base station 20 returns a functional information-receipt message with respect to the mobile station 10 (process 407). This functional-information-receipt message is to confirm that the base station 20 has received the functional information.

Next, the base station 20 allocates either one or plural carriers selected from a carrier "1" to a carrier "3", which is used to communicate with the mobile station 10 (process 408). A detailed content of this carrier allocation will now be explained with reference to FIG. 5.

When a carrier is allocated with respect to the mobile station 10 in the base station 20, the base station 20 transmits this allocated carrier information to the mobile station 10 as a carrier allocation message (process 409). When the mobile station 10 receives this carrier allocation message, this mobile station 10 returns a carrier-allocation-receipt confirming message to the base station 20 (process 410). This carrieral-location-receipt confirming message implies that the carrier information has been received. The mobile station 10 changes setting of the carrier in a wireless unit (not shown) provided in the mobile station 10 in such a manner that this mobile station 10 communicates with the base station 20 by way of this allocated carrier (process 411). When setting of the carrier is completed in the mobile station 10, the mobile station 10 transmits a carrier-changing completion message with respect to the base station 20 (process 412). Upon receipt of this carrier-changing completion message, the base station 20 recognizes that the communication can be carried out by using the carrier allocated to the mobile station 10, and thus, returns a carrier-change completion confirming message to the mobile station 10 (process 413).

The carrier used in the packet communication between the mobile station 10 and the base station 20 may be determined by the above-explained process operations. subsequently, the base station 20 and the mobile station 10 may perform a packet communication by using this determined carrier.

Figure 5:
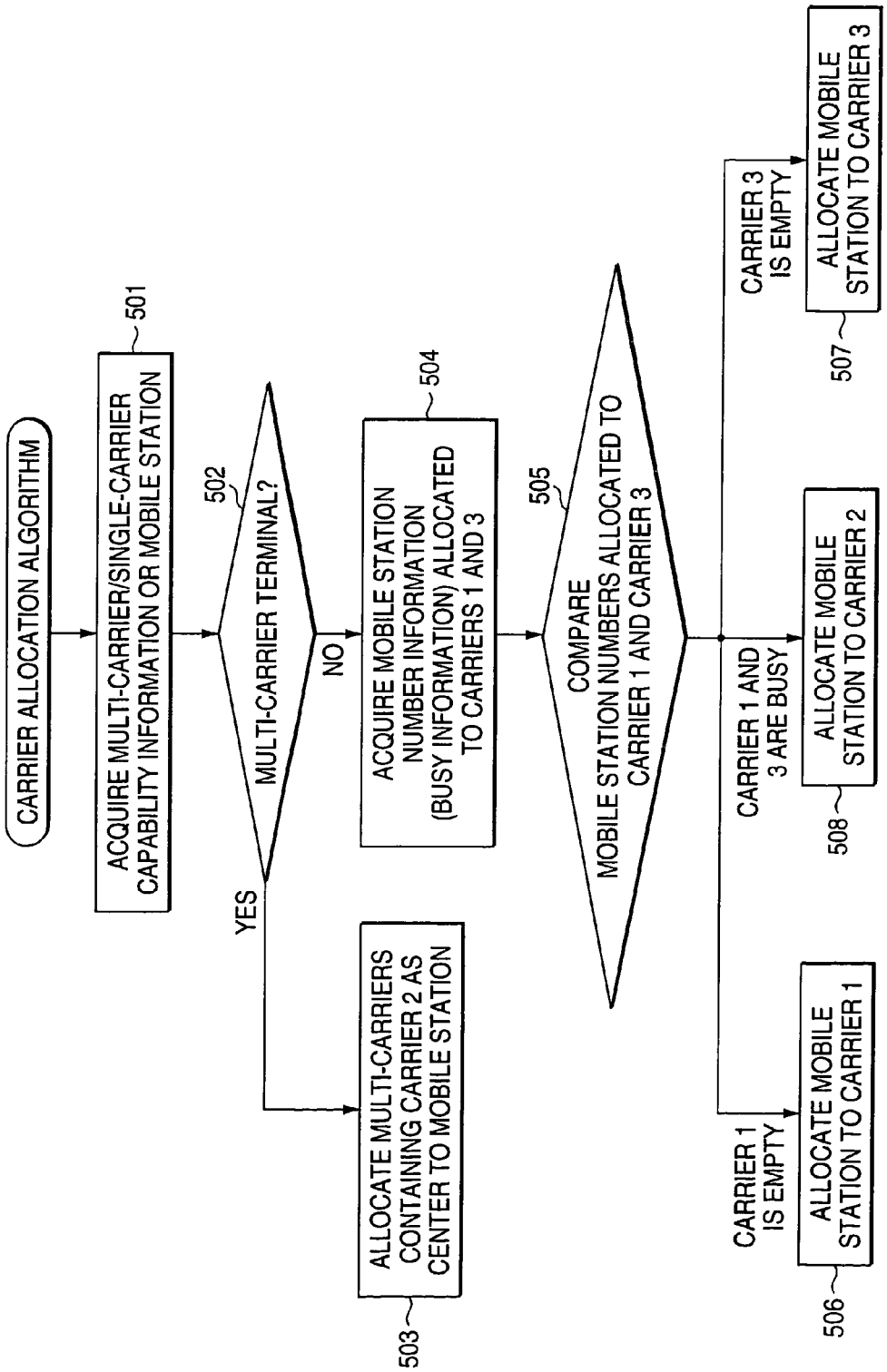
FIG. 5 is a flow chart for describing process operations executed when the base station allocates the carriers to the mobile station.

FIG. 5 is a flow chart for explaining a carrier allocating process operation which is executed as the process 408 of FIG. 4 in the base station 20.

First, the base station 20 refers to the functional information of the mobile station 10 received in the process 406 of FIG. 4 (process 501), this base station 20 judges as to whether the mobile station 10 corresponds to a single-carrier terminal, or a multi-carrier terminal (process 502). In the case that this mobile station 10 corresponds to the multi-carrier terminal, the process operation is advanced to a process 503. Also, in the case that this mobile station 10 corresponds to the single-carrier terminal, the process operation is advanced to a process 504.

In the process 503, the base station 20 executes such an allocation that all of these three carriers are used with respect to the mobile station 10 corresponding to the multi-carrier terminal.

In the process 504, the base station 20 refers to a total number of mobile stations 10 allocated to the carrier 1 and traffic information thereof, and also, a total number of mobile stations 10 allocated to the carrier 3 and traffic information thereof.

Since the base station 20 continuously grasps such a fact that which mobile stations have been allocated to which carriers, this base station 20 can readily grasp such a fact that how many mobile stations have been allocated to the respective carriers. Also, while the base station 20 may compile statistics on time slots in each of these carriers, this base station 20 can grasp both an empty slot ratio and a used slot ratio, and also, can grasp traffics of each of the carriers.

Next, the base station 20 judges a busy condition (congestion condition) based upon the total numbers of the mobile stations allocated to the carrier 1 and the carrier 3, and also the traffics (process 505). In the case that the carrier 1 is not congested with respect to the carrier 3, the base station 20 allocates this carrier 1 to the mobile stations (process 506). In the case that the carrier 3 is not congested with respect to the carrier 1, the base station 20 allocates this carrier 3 to the mobile stations (process 507). In such a case that the base station 20 judges that both the carrier 1 and the carrier 3 are brought into the congestion conditions, the base station 20 allocates the carrier 2 to the mobile stations (process 508).

Figure 6:
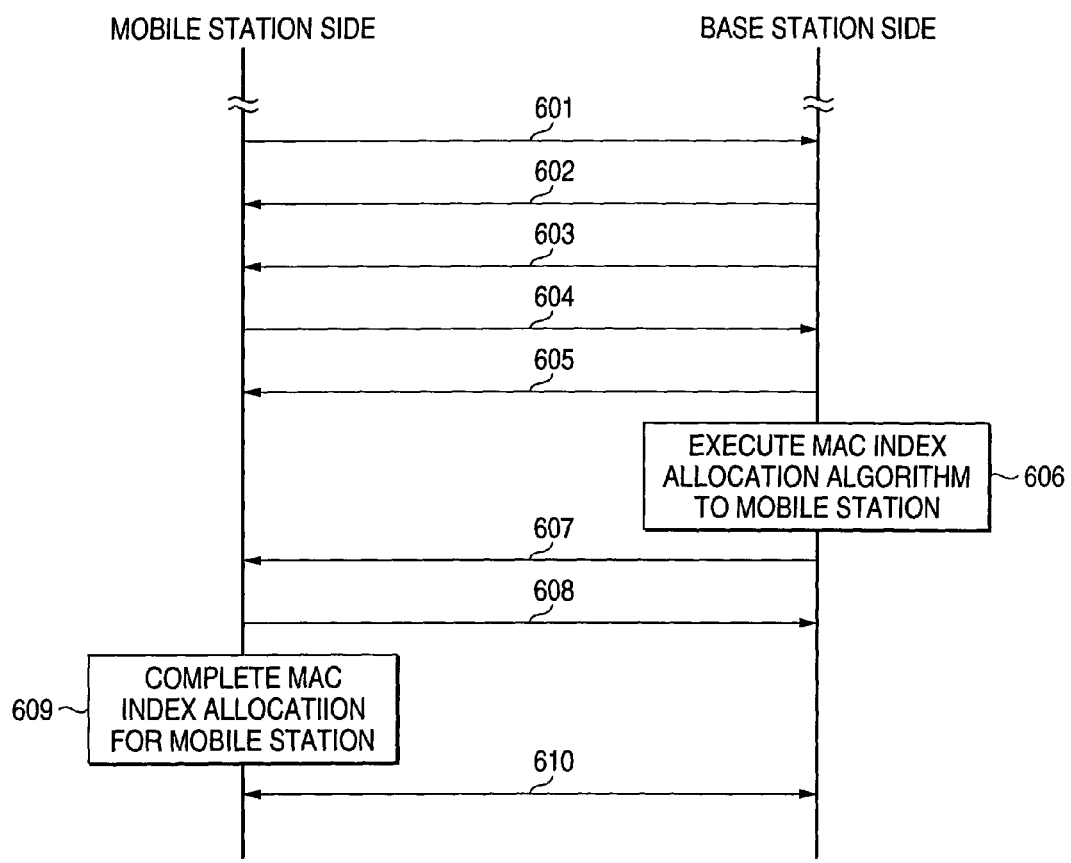
FIG. 6 is a sequence diagram for indicating operations of allocating the MAC indexes between the mobile station and the base station.

Next, a description will now be made of operations executed in the case that the base station 20 allocates MAC indexes to the mobile station 10 with reference to FIG. 6.

First, when a carrier has been determined based upon the sequential operation of FIG. 4 and then the carrier used for the packet communication is set, the mobile station 10 transmits a communication-channel-allocation requesting message to the base station 20, by which the mobile station 10 requires the base station 20 to allocate a communication channel (process 601). When the base station 20 receives this communication channel allocation request message, the base station 20 returns a communication-channel-allocating-request response message to the mobile station 10, by which the base station 20 confirms the reception of the request message (process 602). Then, the base station 20 transmits an MAC index-allocation-mobile-station-information requesting message to the mobile station 10, by which the base station 20 requires such an information (will be referred to as "mobile station information" hereinafter) which is needed when a MAC index is allocated. As this mobile station information, information as to whether the mobile station 10 corresponds to the multi-carrier terminal, or the single-carrier terminal is required, and/or information about communication quality conditions of the mobile station 10 is required (process 603).

When the mobile station 10 receives this information request message, the mobile station 10 transmits with respect to the base station 20, such an MAC index-allocation-mobile-station-information-request responding message which contains the information as to terminal sorts of the mobile station and the information as to the communication quality condition of the mobile station as the mobile station information (process 604). When the base station 20 receives the mobile station information, this base station 20 transmits an information-reception responding message capable of confirming the reception (process 605).

Based upon this mobile station information, the base station 20 allocates an MAC index with respect to the mobile station 10. This MAC index allocating process operation will be discussed later with reference to FIG. 7.

When the MAC index is allocated, the base station 20 transmits an MAC index allocation message with respect to the mobile station 10 so as to notify this MAC index (process 607). When the mobile station 10 receives this MAC index allocation message, the mobile station 10 returns an information-reception responding message to the base station 20, by which the reception of this MAC index allocation message is confirmed (process 608). Then, this mobile station 10 stores the allocated MAC index into the storage unit (not shown) provided in this mobile station, and is set to such a communicatable condition that a packet to which the MAC index has been added may be transmitted and/or received (process 609).

As a consequence, both the base station 20 and the mobile station 10 can execute the data communications using the MAC index (process 610).

FIG. 7 is a flow chart for explaining detailed contents of the above-described MAC index allocating operation.

First, the base station 20 recognizes that the mobile station 10 which performs the data communication corresponds to either the single-carrier terminal or the multi-carrier terminal based upon the information received in the above-explained process 406 of FIG. 4 so as to thereby acquire the recognition information (process 701), and also, recognizes the carrier of the mobile station 10 which has been set in the above-explained process 408 of FIG. 4 so as to thereby acquire the recognized carrier (process 702).

In the case that the base station 20 recognizes that the mobile station 10 corresponds to the multi-carrier terminal based upon the above-described information, the process operation is advanced to a process 704. Also, in the case that the base station 20 recognizes that the mobile station 10 corresponds to the single-carrier terminal based upon the above-described information, the process operation is advanced to a process 710 (process 703).

In the process 704, the base station 20 judges as to whether or not there is an empty index in MAC indexes which may be allocated to the multi-carrier terminal. When there is such an empty index in the MAC indexes for the multi-carrier terminal, the process operation is advanced to a process 705. In this process 705, the base station 20 allocates the MAC index to the mobile station 10, and stores the carrier used by the mobile station 10 in relation to the MAC index.

Both this mobile station 10 and the carrier used by this mobile station 10 are allocated to the code map of the MAC index, which are stored. As the code map according to the embodiment of the present invention, such a 6-bit code map (see FIG. 2) is used which is constituted by 64 sorts of elements (namely, 0 to 63 elements). At this time, these 64 sorts of elements are allocated to single-carrier terminals from the forward direction, whereas these 64 sorts of elements are allocated to multi-carrier terminals from the reverse direction by the base station 20 (for example, code maps of MAC indexes are allocated with respect to single-carrier terminals in this order of 0, 1, 2, 3, 4, - - - , and are allocated with respect to multi-carrier terminals in this order of 63, 62, 61, - - - , by base station 20). As a result, both the carriers and the time slots are exclusively allocated to the respective mobile stations, so that both the time slots and the carriers may be effectively utilized under maximum condition.

When the base station 20 judges that there is no empty index in the MAC indexes allocatable to the multi-carrier terminal in the process 704, the process operation is advanced to a process 706 in which the base station 20 judges as to whether or not there is such an empty index in the MAC indexes allocatable to the single-carrier terminal. If there is also no empty index in the MAC indexes allowable to the single-carrier terminal, then the base station 20 judges that the present total number of the mobile stations is reached to an upper limit number of communicatable mobile stations within the cell of this base station 20, the base station 20 sends such a message of congestion conditions to the mobile station (process 707), and thus, the process operation is accomplished.

On the other hand, when there is an empty index in the MAC indexes allocatable to the single-carrier terminal, the base station 20 allocates the empty region of the MAC indexes allocatable to the single-carrier terminal to the region of the MAC indexes allocatable to the multi-carrier terminals (process 708), and allocates the MAC index of the added empty area to the mobile station (namely, multi-carrier terminal) (process 709).

In this embodiment of the present invention, a boundary between the region of the MAC index used by the single-carrier terminal and the region of the MAC index used by the multi-carrier terminal has been previously set. In such a case that any one of the single-carrier terminal and the multi-carrier terminal firstly is brought into the congestion condition and an empty region is consumed, the boundary of these regions may be moved, so that the region whose congestion condition is high may be increased.

Alternatively, while the boundary between the region for the MAC index used by the single-carrier terminal and the region for the MAC index used by the multi-carrier terminal is fixed, a ratio of single-carrier mobile stations to multi-carrier mobile stations, which may be communicated with each other within the same cell, may be previously set to a fixed value.

Further, while separate code maps are prepared for single-carrier terminals and multi-carrier terminals, these code maps may be individually allocated thereto. In this alternative case, the allocation of the code map may not be influenced by the congestion condition of the other sort of terminal.

In the case that the base station 20 judges that the mobile station 10 which performs the communication corresponds to the single-carrier terminal in the process 703, the base station 20 executes such process operations similar to those defined from the above-explained processes 704 to 709. Then, the base station 20 transmits such a message that the present communication condition is under congestion condition, namely waits for an empty region, and accomplishes the process operation, or allocates the MAC index (from process 710 to process 715).

Since the above-described process operations are carried out, the MAC indexes may be allocated from the base station 20 to the mobile station 10.

Next, a sequential operation executed in such a case that both the base station 20 and the mobile station 10 perform packet communications based upon allocated MAC indexes will now be explained.

In such a case that a data transmission request is issued from the mobile station 10, the base station 20 firstly refers to the MAC indexes, acquires both the mobile station 10 and the carrier allocated to this mobile station 10, and allocates a frame corresponding to one time interval with respect to one MAC index, and thus, transmits packets in accordance with an allocated sequence. This frame contains time slots of the respective carriers. It should be noted that this frame may have a fixed length, or a variable length.

Figure 9A:
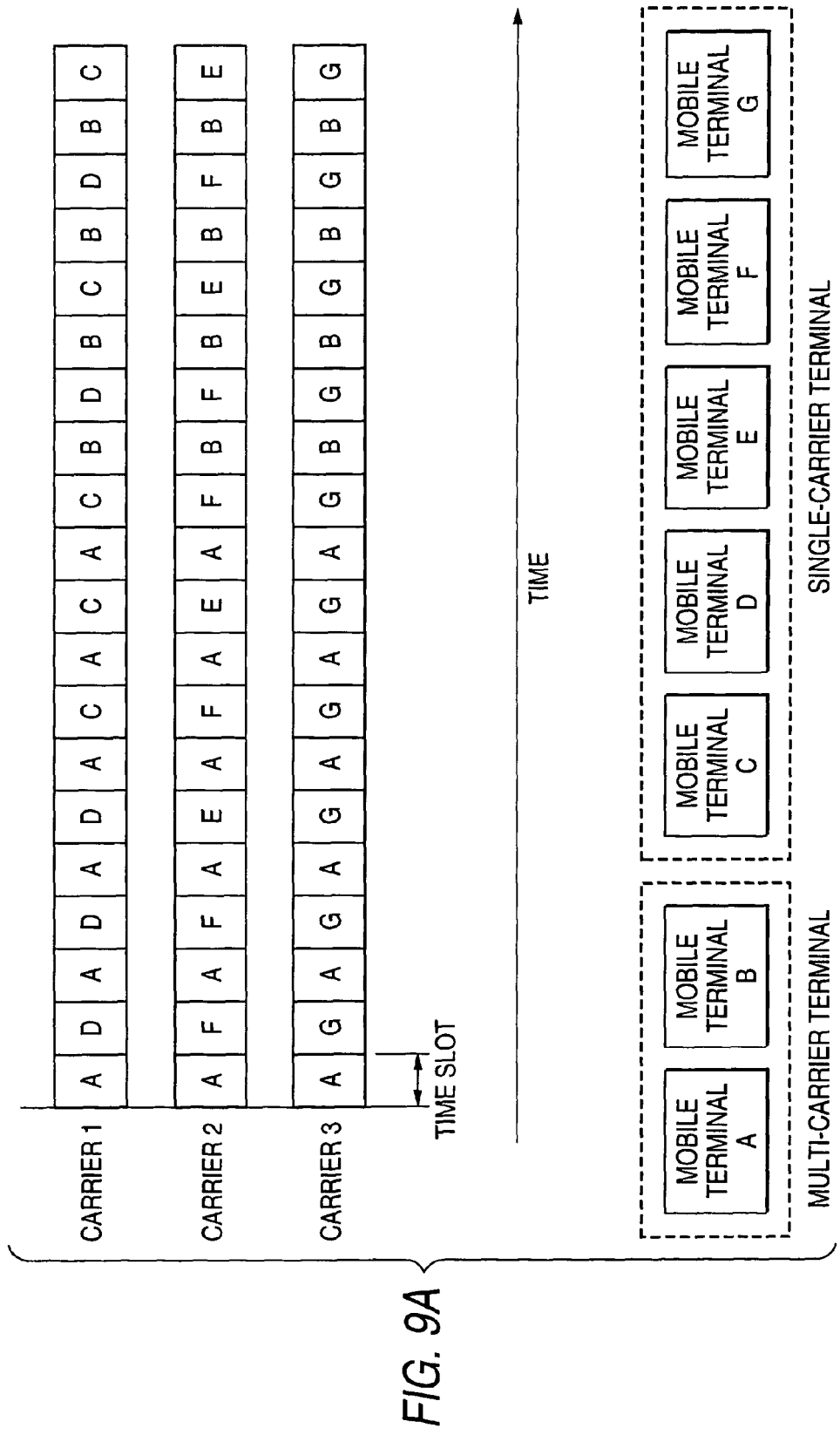
FIG. 9A is a schematic allocation diagram for allocating frames to the respective mobile terminals.

Alternatively, when the mobile station 20 allocates the respective mobile terminals involved in the mobile station 10 to frames, as illustratively shown in FIG. 9A and FIG. 9B, assuming now that one time slot is recognized as one frame, frames allocated to single-carrier terminals and frames allocated to multi-carrier terminals may be alternately allocated in an equi-interval.

When the frame allocation is determined, the base station 20 sequentially transmits packets to which headers containing the MAC indexes have been added.

The mobile station 10 refers to the header, and receives the packet by recognizing a packet length, a time unit length, and the like. When the time unit is ended, the mobile station 10 is prepared for receiving a next packet.

Figure 8A:
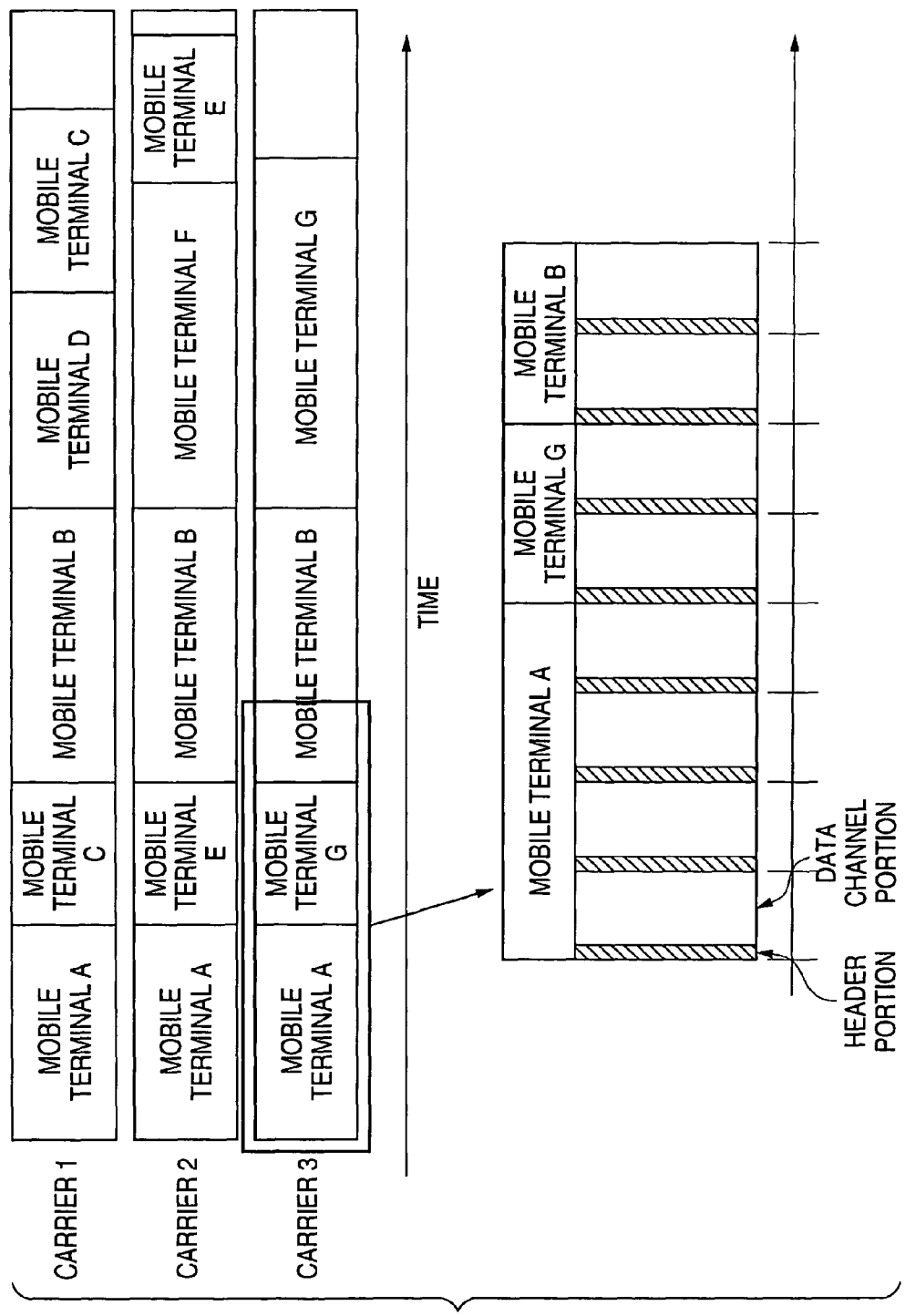
FIG. 8A is a schematic diagram of a packet used in communications between the base station and the mobile station.
Figure 8B:
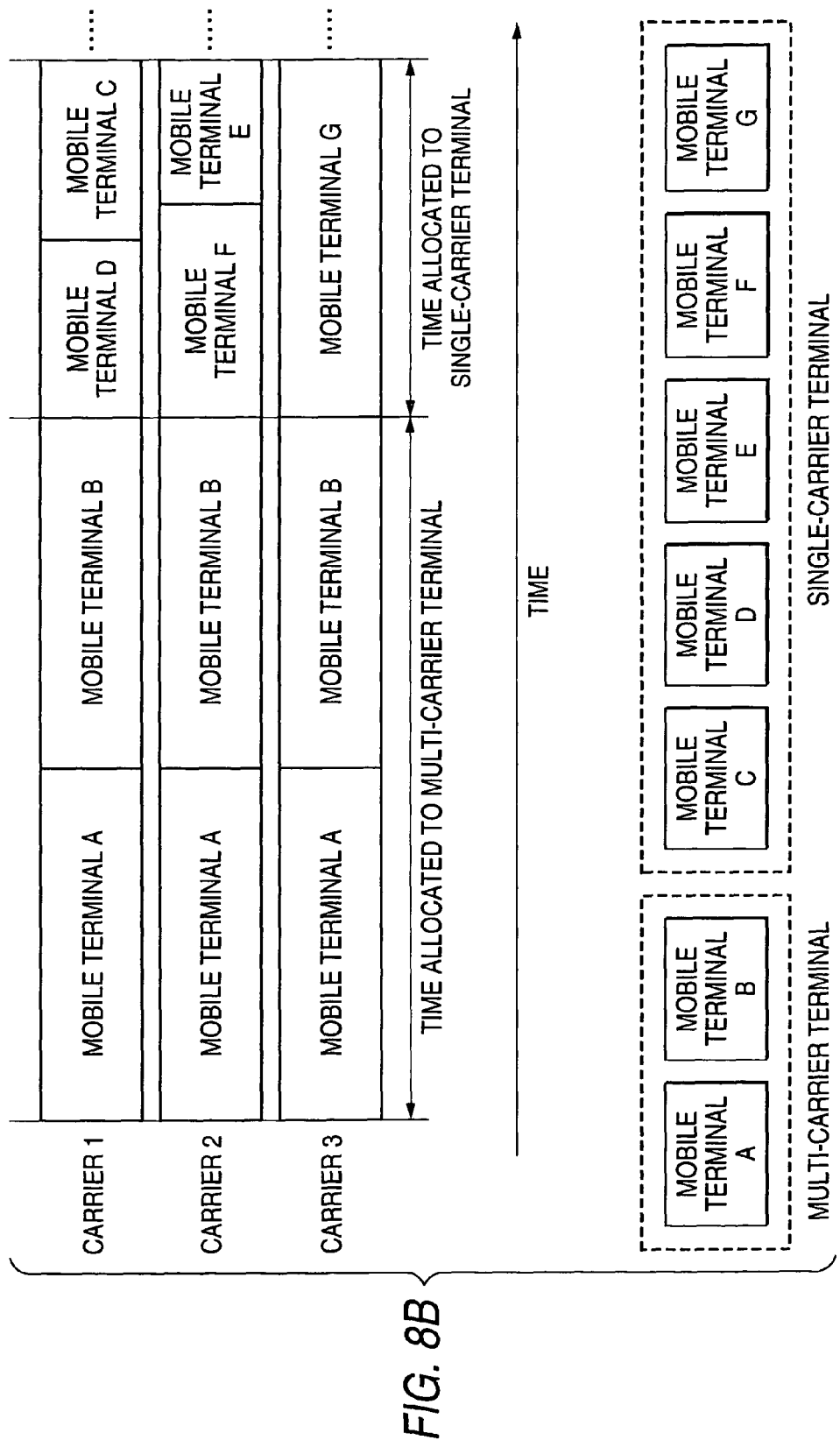
FIG. 8B is a schematic allocation diagram for allocating frames to the respective mobile terminals.

In the communication system of portable telephones according to this embodiment, when the respective portable stations 10 are allocated to the respective frames, as indicated in FIG. 8B, a distribution of the frames which are allocated to the single-carrier terminals to the frames which are allocated to the multi-carrier terminals may be managed and determined on the side of the base station 20.

This distribution may be carried out in accordance with any of the following means.

While a ratio of frames which are employed by single-carrier terminals and multi-carrier terminals in a communication is previously set, these frames are allocated to these single-carrier/multi-carrier terminals based upon this set ratio.

While a calculation is made of a ratio of an average value of communication qualities reported from the respective single-carrier terminals to another average value of communication qualities reported from the respective multi-carrier terminals, the frames are allocated to these terminals based upon this calculated ratio.

While a calculation is made of a ratio of a maximum value of communication qualities reported from the respective single-carrier terminals to another maximum value of communication qualities reported from the respective multi-carrier terminals, the frames are allocated to these terminals based upon this calculated ratio.

While a calculation is made of a ratio of a total number of the single-carrier terminals to a total number of the multi-carrier terminals, the frames are allocated based upon this calculated ratio.

Subsequently, the respective means will now be explained. It should be noted that in this example, allocation sequences in such a case that a total number of time slots is equal to 256 will be described.

In the means 1, in the communication executed within the same cell on the side of the base station 20, while a ratio of the single-carrier terminals to the multi-carrier terminals is previously determined by the base station 20, the frames are allocated based upon this determined ratio. For instance, in such a case that the ratio of the single-carrier terminals to the multi-carrier terminals is previously determined as 1:3, the frame allocation is carried out in such a sequence that after such a frame constituted by employing 64 (=256×(¼)) pieces of time slots as one set has been allocated to a single-carrier terminal, another frame constituted by employing 192 (=256×(¾)) pieces of time slots as one set has been allocated to a multi-carrier terminal, and these frame allocations are alternately repeated (see FIG. 10). In this means 1, traffic amounts within a cell may be totally managed by the base station 20.

In the means 2, while communication qualities reported from the base station 10 to the base station 20 are totalized, and then, a calculation is made of a ratio of an average value of the communication qualities reported from the respective single-carrier terminals to another average value of the communication qualities reported from the respective multi-carrier terminals, the base station 20 dynamically manages the allocations of the frames in response to this calculated ratio.

Figure 11:
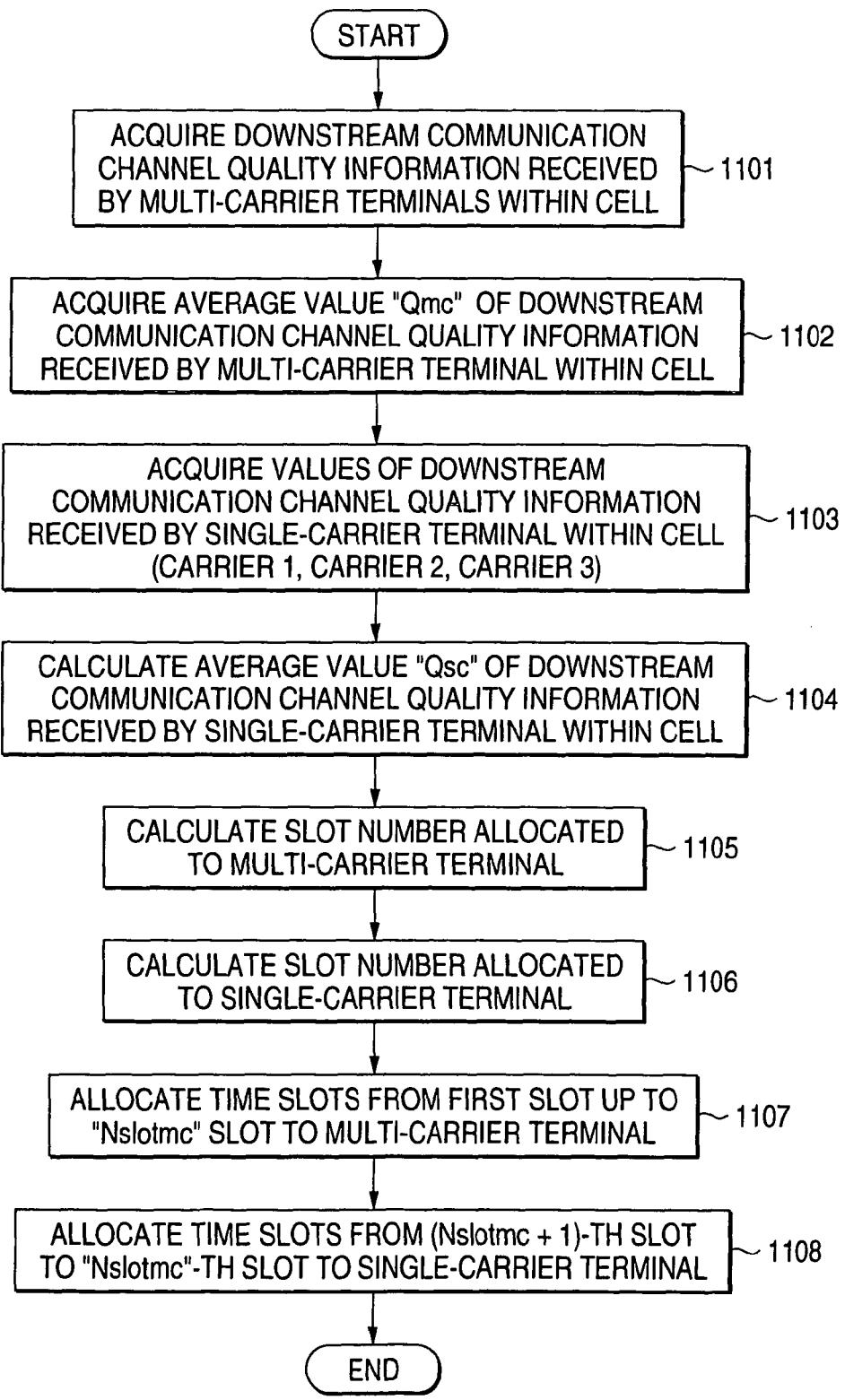
FIG. 11 is a flow chart for describing frame allocation operations based upon a ratio of average values of communication qualities.

FIG. 11 is a flow chart for explaining frame allocation sequential operations executed by this means 2.

First, the base station 20 acquires communication quality information of multi-carrier terminals along a downstream direction among the mobile stations 10 which perform communications within a cell. Since the acquired communication quality information is contained in a header of a communication packet along an upstream direction, which are carried out from the mobile station 10 with respect to the base station 20, this base station 20 receives this communication packet to analyze this header thereof (process 1101).

Next, an average value of the communication quality information of the multi-carrier terminals is obtained. This average value may be calculated in accordance with formula (1) (process 1102).

(average value "$Q_{mc}$" of communication qualities of multi-carrier terminals)=(total value of received communication quality values)/(total number of multi-carrier terminals)     [Formula 1]

Similarly, communication quality information of the single-carrier terminals is received (process 1103), and an average value thereof may be calculated in accordance with formula (2) (process 1104).

(average value "$Q_{sc}$" of communication qualities of single-carrier terminals)=[{(total value of received communication quality values in carrier 1)/(total number of single-carrier terminals in carrier 1)}+{(total value of received communication quality values in carrier 2)/(total number of single-carrier terminals in carrier 2)}+{(total value of received communication quality values in carrier 3)/(total number of single-carrier terminals in carrier 3)}]/3     [Formula 2]

Next, the base station 20 determines a total number of frames to be allocated based upon this calculated average value. First, a total number of time slots which are allocated to the multi-carrier terminals is calculated in accordance with the following formula (3) (process 1105).

$$N_{slotmc}=int(256 \times Q_{mc} \div (Q_{sc}+Q_{mc})) \quad \text{[Formula 3]}$$

Similarly, a total number of time slots which are allocated to the single-carrier terminals is calculated in accordance with the following formula (4) (process 1106).

$$N_{slotsc}=int(256 \times Q_{sc} \div (Q_{sc}+Q_{mc})) \quad \text{[Formula 4]}$$

Based on the calculation values, the base station 20 allocates plural time slots defined from a first time slot up to an $N_{slotmc}$-th time slot to the communications of the multi-carrier terminals with respect to three carriers defined from the carrier 1 up to the carrier 3 (process 1107). In such a case that a plurality of multi-carrier terminals are involved in the mobile station 10, the base station 20 sets such frames which are constituted by subdividing this frame (arranged by "$N_{slotmc}$" pieces of time slots), and then, allocates the respective multi-carrier terminals to the respective subdivided frames.

Next, the base station 20 allocates plural time slots defined from an ($N_{slotmc}$+1)-th time slot up to an $N_{slotmc}$-th time slot to the communications of the single-carrier terminals with respect to three carriers defined from the carrier 1 up to the carrier 3 (process 1108)

In the case that a plurality of single-carrier terminals are involved in the mobile station 10, the base station 20 sets such frames which are constituted by subdividing this frame (arranged by "$N_{slotsc}-(N_{slotmc}+1)$" pieces of time slots), and then, allocates the respective single-carrier terminals to the respective subdivided frames.

When the communications are carried out from the first time slot up to the 256th time slot, the process operations defined from the process 1101 up to the process 1108 are repeatedly carried out with respect to 256 pieces of next time slots.

In the above-explained means 2, the ratio of the frame numbers is determined based upon the ratio of the average value of the communication qualities for the single-carrier terminals to the average value of the communication qualities for the multi-carrier terminals. As a result, the base station 20 can determine the priority order of the communications in the dynamic manner in response to the communication quality conditions of the respective terminals within the cell.

The means 3 is featured by that while communication qualities reported from the mobile station 10 with respect to the base station 20 are totalized, a calculation is made of a ratio of a maximum value of communication qualities reported from the respective single-carrier terminals to another maximum value of communication qualities reported from the respective multi-carrier terminals, and then the base station 20 manages the allocation of these frames in response to this calculated ratio in a dynamic manner.

Figure 12:
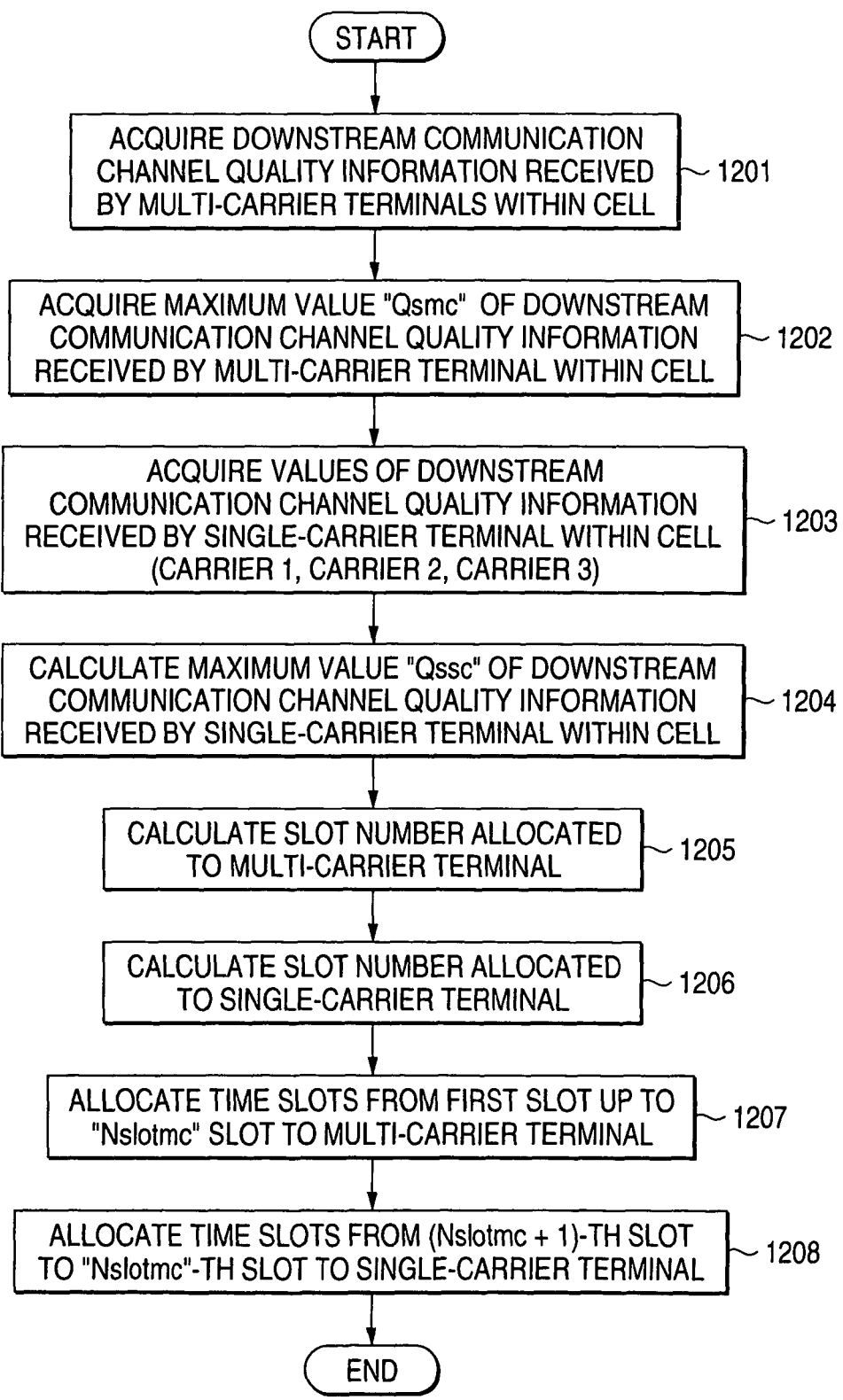
FIG. 12 is a flow chart for describing frame allocation operations based upon a ratio of maximum values of communication qualities.

FIG. 12 is a flow chart for explaining sequential operations of the frame allocations by executing this means 3.

First, the base station 20 acquires communication quality information of multi-carrier terminals along a downstream direction among the mobile stations 10 which perform communications within a cell. Since the acquired communication quality information is contained in a header of a communication packet along an upstream direction, which are carried out from the mobile station 10 with respect to the base station 20, this base station 20 receives this communication packet to analyze the header thereof (process 1201).

Next, a maximum value "$Q_{smc}$" of the communication quality information of these multi-carrier terminals is obtained (process 1202).

Next, the base station 20 similarly receives communication quality information of the single-carrier terminals (process 1203), and then obtains a maximum value "$Q_{ssc}$" (process 1204).

Next, the base station 20 determines a total number of frames to be allocated based upon this calculated maximum value. First, a total number of time slots which are allocated to the multi-carrier terminals is calculated in accordance with the following formula (5) (process 1205).

$$N_{slotmc}=int(256 \times Q_{Smc} \div (Q_{Ssc}+Q_{Smc})) \quad \text{[Formula 5]}$$

Similarly, a total number of time slots which are allocated to the single-carrier terminals is calculated in accordance with the following formula (6) (process 1206).

$$N_{slotsc}=int(256 \times Q_{Ssc} \div (Q_{Ssc}+Q_{Smc})) \quad \text{[Formula 6]}$$

Based upon the calculation results, the base station 20 allocates plural time slots defined from a first time slot up to an $N_{slotmc}$-th time slot to the communications of the multi-carrier terminals with respect to three carriers defined from the carrier 1 up to the carrier 3 (process 1207). In such a case that a plurality of multi-carrier terminals are involved in the mobile station 10, the base station 20 sets such frames which are constituted by subdividing this frame (which is arranged by "$N_{slotmc}$" pieces of time slots), and then, allocates the respective multi-carrier terminals to the respective subdivided frames.

Next, the base station 20 allocates plural time slots defined from an ($N_{slotmc}$+1)-th time slot up to an ($N_{slotmc}$)-th time slot to the communications of the single-carrier terminals with respect to three carriers defined from the carrier 1 up to the carrier 3 (process 1208).

In the case that a plurality of single-carrier terminals are involved in the mobile station 10, the base station 20 sets such frames which are constituted by subdividing this frame (which is arranged by "$N_{slotsc}-(N_{slotmc}+1)$" pieces of time slots), and then, allocates the respective single-carrier terminals to the respective subdivided frames.

When the communications are carried out from the first time slot up to the 256th time slot, the process operations defined from the process 1201 up to the process 1208 are repeatedly carried out with respect to 256 pieces of next time slots.

In the above-explained means 3, the ratio of the frame numbers is determined based upon the ratio of the maximum value of the communication qualities for the single-carrier terminals to the maximum value of the communication qualities for the multi-carrier terminals. As a result, the base station 20 can determine the priority order of the communications in the dynamic manner in response to the communication quality conditions of the respective terminals within the cell.

The means 4 is featured by that while a calculation is made of a ratio of a total number of single-carrier terminals to another total number of multi-carrier terminals, which are contained in terminals included within the mobile station 10 communicated with the base station 20, the base station 20 manages allocations of frames in response to this calculated ratio in a dynamic manner.

Figure 13:
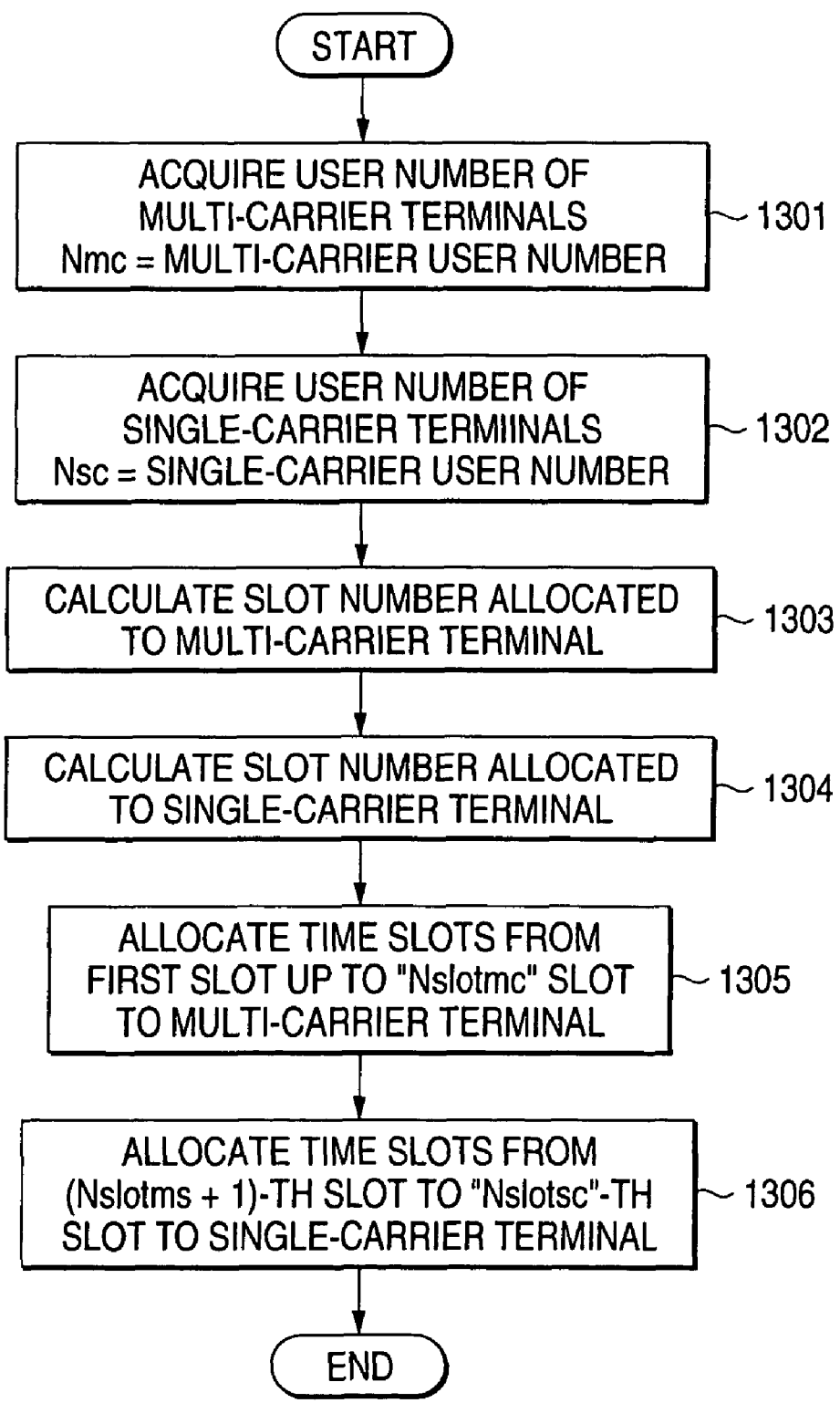
FIG. 13 is a flow chart for describing frame allocation operations based upon a ratio of total values of terminals.

FIG. 13 is a flow chart for explaining process operations of the frame allocations by executing this means 4.

First, the base station 20 acquires a total number "$N_{mc}$" of multi-carrier terminals (process 1301).

Next, the base station 20 acquires a total number "$N_{sc}$" of single-carrier terminals (process 1302).

Subsequently, the base station 20 determines a total number of frames to be allocated based upon the total numbers of the respective single-carriers/multi-carrier terminals. First, a total number of time slots which are allocated to the multi-carrier terminals is calculated based upon the following formula (7) (process 1303).

$$N_{slotmc} = int(256 \times N_{mc} \div (N_{sc} + N_{mc}))$$ [Formula 7]

Similarly, a total number of time slots which are allocated to the single-carrier terminals is calculated in accordance with the following formula (8) (process 1304).

$$N_{slotc} = int(256 \times N_{sc} \div (N_{sc} + N_{mc}))$$ [Formula 8]

Based upon the calculation results, the base station 20 allocates plural time slots defined from a first time slot up to an $N_{slotmc}$-th time slot to the communications of the multi-carrier terminals with respect to three carriers defined from the carrier 1 up to the carrier 3 (process 1305). In such a case that a plurality of multi-carrier terminals are involved in the mobile station 10, the base station 20 sets such frames which are constituted by subdividing this frame (which is arranged by "$N_{slotmc}$" pieces of time slots), and then, allocates the respective multi-carrier terminals to the respective subdivided frames.

Next, the base station 20 allocates plural time slots defined from an ($N_{slotmc}$+1)-th time slot up to an ($N_{slotmc}$)-th time slot to the communications of the single-carrier terminals with respect to three carriers defined from the carrier 1 up to the carrier 3 (process 1306).

In the case that a plurality of single-carrier terminals are involved in the mobile station 10, the base station 20 sets such frames which are constituted by subdividing this frame (which is arranged by "$N_{slotsc} - (N_{slotmc}+1)$" pieces of time slots), and then, allocates the respective single-carrier terminals to the respective subdivided frames.

When the communications are carried out from the first time slot up to the 256th time slot, the process operations defined from the process 1301 up to the process 1306 are repeatedly carried out with respect to 256 pieces of next time slots.

In the above-explained means 4, the ratio of the frame numbers is determined based upon the total number of the single-carrier terminals and the total number of the multi-carrier terminals. As a result, the base station 20 can allocate a larger number of frames to such terminals whose user number is larger in a dynamic manner in the case that a total number of users who use either the multi-carrier terminals or the single-carrier terminals is increased, as compared with another total number of users, and therefore, can increase the priority order of the communications with respect to the first-mentioned users.

What is claimed:

1. A wireless communication system comprising:
    a base station;
    a single-carrier wireless communication terminal for performing a packet communication with said base station; and
    a multi-carrier wireless communication terminal for performing a packet communication with said base station substantially at the same time,
    wherein said base station comprises:
        a storage section for storing allocation information, wherein the storage section sets and stores a first allocation information region for the single-carrier wireless communication terminal and a second allocation information region for the multi-carrier wireless communication terminal;
        a first allocation section for at least one of allocating a carrier to said single-carrier wireless communication terminal and carriers to said multi-carrier wireless communication terminal from a plurality of carriers, said allocated carrier or carriers to be used during communication with said base station; and
        a second allocation section for allocating allocation information of the single-carrier set in the first allocation information region for at least one of said single-carrier wireless communication terminal and for allocating allocation information of the multi-carrier set in the second allocation information region for at least one of said multi-carrier wireless communication terminal based on the availability of said allocation information, wherein said allocation information identifies a wireless communication terminal communicating with said base station.

2. A wireless communication system as claimed in claim 1 wherein said storage section stores said allocation information in such a manner that said allocation information is arrayed in accordance with a predetermined sequence; and
    said second allocation section allocates said allocation information with respect to said single-carrier wireless communication terminal from one direction of said array, and also allocates said allocation information to said multi-carrier wireless communication terminal from the other direction of said array.

3. A wireless communication system as claimed in claim 2 wherein said second allocation section is capable of changing a boundary in said array between said allocation information allocated to said single-carrier wireless communication terminal and said allocation information allocated to said multi-carrier wireless communication terminal.

4. A wireless communication system as claimed in claim 1 wherein said storage section stores therein both the allocation information allocated to said single-carrier wireless communication terminal and the allocation information allocated to said multi-carrier wireless communication terminal as separate arrays.

5. A wireless communication system as claimed in claim 1 wherein said packet communication is carried out by using a variable length packet.

6. A wireless communication system as claimed in claim 1, further comprising:
    a time slot allocating section for allocating time slots which are used in packet communications by said single- and multi-carrier wireless communication terminals, the time slot allocating section allocates one wireless communication terminal among said single- and multi-carrier wireless communication terminals to one unit of a time slot distribution used by said single- and multi-carrier wireless communication terminals in the packet communications for said one carrier and each of said plurality of carriers.

7. A wireless communication system as claimed in claim 6, wherein said time slot allocating section allocates one wireless communication terminal among said single- and multi-carrier wireless communication terminals to one unit of a time slot distribution used by said single- and multi-carrier wireless communication terminals in the packet communications for said one carrier and each of said plurality of carriers, and also allocates said single-carrier wireless communication terminal and said multi-carrier wireless communication terminal in an independent manner.

8. A wireless communication system as claimed in claim 6, wherein said time slot allocating section allocates one wireless communication terminal among said single- and multi-carrier wireless communication terminals to one unit of a time slot distribution used by said single- and multi-carrier wireless communication terminals in the packet communications for said one carrier and each of said plurality of carriers, and also allocates said first wireless communication terminal and said second wireless communication terminal in an alternate manner.

9. A wireless communication system as claimed in claim 6, wherein said packet communication is carried out by using a variable length packet.

10. A wireless communication system as claimed in claim 1 further comprising:
a time slot allocating section for allocating time slots which are used in packet communications by said single- and multi-carrier wireless communication terminals; and
a time slot distribution determining section for determining a time slot distribution which can be used by both said single-carrier wireless communication terminal and said multi-carrier wireless communication terminal.

11. A wireless communication system as claimed in claim 10 wherein said time slot allocating section allocates time slots which are independently used in the packet communications by said single- and multi-carrier wireless communication terminals within the time slot distribution which can be used by said single-carrier wireless communication terminal and the time slot distribution which can be used by said multi-carrier wireless communication terminal, both said time slot distributions being determined by said time slot distribution determining section.

12. A wireless communication system as claimed in claim 10 wherein said time slot distribution determining section determines the time slot distributions which can be used by said first wireless communication terminal and said second wireless communication terminal based upon a comparison result made between communication qualities of said single-carrier wireless communication terminal and communication qualities of said multi-carrier wireless communication terminal.

13. A wireless communication system as claimed in claim 12 wherein said time slot distribution determining section determines the time slot distributions which can be used by said single-carrier wireless communication terminal and said multi-carrier wireless communication terminal based upon a comparison result made between an average value of communication qualities of said single-carrier wireless communication terminal and an average value of communication qualities of said multi-carrier wireless communication terminal.

14. A wireless communication system as claimed in claim 12 wherein said time slot distribution determining section determines the time slot distributions which can be used by said single-carrier wireless communication terminal and said multi-carrier wireless communication terminal based upon a comparison result made between a maximum value of communication qualities of said single-carrier wireless communication terminal and a maximum value of communication qualities of said multi-carrier wireless communication terminal.

15. A wireless communication system as claimed in claim 10 wherein said time slot distribution determining section determines the time slot distributions which can be used by said single-carrier wireless communication terminal and said multi-carrier wireless communication terminal based upon a comparison result made between a total number of said single-carrier wireless communication terminals and also a total number of said multi-carrier wireless communication terminals, which are connected to said base station.

16. A base station apparatus for performing a packet communication with respect to both a first wireless communication terminal for performing a packet communication by using a single carrier, and a second wireless communication terminal for performing a packet communication by using a plurality of carriers at the same time, said base station apparatus comprising:
a storage section for storing allocation information, wherein the storage section sets and stores a first allocation information region for the first wireless communication terminal and a second allocation information region for the second wireless communication terminal;
a first allocation section for at least one of allocating a carrier to said first wireless communication terminal and carriers to said second wireless communication terminal from a plurality of carriers, said allocated carrier or carriers to be used during communication with said base station;
a second allocation section for allocating allocation information of the single-carrier set in the first allocation information region for at least one of said first wireless communication terminal and for allocating allocation information of the plurality of carriers set in the second allocation information region for at least one of said second wireless communication terminal based on the availability of said allocation information, wherein said allocation information identifies a wireless communication terminal communicating with said base station.

17. A base station apparatus as claimed in claim 16, wherein said packet communication is carried out by using a variable length packet.

18. A base station apparatus as claimed in claim 16, further comprising:
a time slot allocating section for allocating time slots which are used by the wireless communication terminals in packet communications, said time slot allocating section allocates one wireless communication terminal among said first and second wireless communication terminals to one unit of a time slot distribution used by said first and second wireless communication terminals in the packet communications for said one carrier and each of said plurality of carriers.

19. A base station apparatus as claimed in claim 18, wherein said packet communication is carried out by using a variable length packet.

20. A base station apparatus as claimed in claim 16 further comprising:
a time slot allocating section for allocating time slots which are used in packet communications by said first and second wireless communication terminals; and
a time slot distribution determining section for determining a time slot distribution which can be used by both said first wireless communication terminal and said second wireless communication terminal.

21. A base station apparatus as claimed in claim 20 wherein said packet communication is carried out by using a variable length packet.

22. A wireless communication system comprising;
a base station;
a first wireless communication terminal for performing a packet communication with respect to said base station by using a single carrier; and
a second wireless communication terminal for performing a packet communication with respect to said base station by using a plurality of carriers at the same time, wherein said base station comprises:
a storage section for storing allocation information, wherein the storage section sets and stores a first allocation information region for the first wireless communication terminal and a second allocation information region for the second wireless communication terminal;
a first allocation section for at least one of allocating a carrier to said first wireless communication terminal and carriers to said second wireless communication terminal from a plurality of carriers, said allocated carrier or carriers to be used during communication with said base station; and
a second allocation section for allocating allocation information of the single-carrier set in the first allocation information region for said first wireless communication terminal, and for allocating allocation information of the plurality of carriers set in the second allocation information region for said second wireless communication terminal based on the availability of said allocation information; and
wherein said allocation information is for identifying a wireless communication terminal communicating with said base station and wherein said allocation information is for identifying one carrier or a plurality of carriers.

23. A wireless communication system as claimed in claim 22 wherein said second allocation information storage section stores said allocation information in such a manner that said allocation information is arrayed in accordance with a predetermined sequence; and
said second allocation information applying section allocates said single-carrier allocation information with respect to said first wireless communication terminal from one direction of said array of allocation information, and also allocates said multi-carrier allocation information to said second wireless communication terminal from the other direction of said array when said second wireless communication terminal performs the communication by using said plurality of carriers.

24. A wireless communication system as claimed in claim 23 wherein said second allocation section is capable of changing a boundary in said array between said single-carrier allocation information allocated to said first wireless communication terminal and said multi-carrier allocation information allocated to said second wireless communication terminal when said second wireless communication terminal performs the communication by using said plurality of carriers.

25. A wireless communication system as claimed in claim 23 wherein said packet communication is carried out by using a variable length packet.

26. A wireless communication system as claimed in claim 22 wherein said allocation information storage section stores therein both the single-carrier allocation information allocated to said first wireless communication terminal and the multi-carrier allocation information allocated to said second wireless communication terminal said second wireless communication terminal performs the communication by using said plurality of carriers, as separate arrays.

27. A wireless communication system as claimed in claim 22 wherein when said second wireless communication terminal performs the communication by using said plurality of carriers, said second allocation information applying section allocates said single-carrier allocation information to said second wireless communication terminal in a case that said multi-carrier allocation information is unavailable.

28. A wireless communication system as claimed in claim 22 wherein said second allocation section allocates said multi-carrier allocation information to said first wireless communication terminal in a case that said single-carrier allocation information is unavailable.

29. A wireless communication system as claimed in claim 28, further comprising:
an allocating section for allocating frames which are used in packet communications by said first and second wireless communication terminals,
wherein said allocating section allocates one wireless communication terminal among said first and second wireless communication terminals to one unit of the frames used by said first and second wireless communication terminals in the packet communications for said one carrier and each of said plurality of carriers.

30. A wireless communication system as claimed in claim 29, wherein said allocating section allocates one wireless communication terminal among said first and second wireless communication terminals to one unit of the frames used by said first and second wireless communication terminals in the packet communications every said carrier, and also allocates said first wireless communication terminal and said second wireless communication terminal in an independent manner.

31. A wireless communication system as claimed in claim 29, wherein said allocating section allocates one wireless communication terminal among said first and second wireless communication terminals to one unit of the frames used by said first and second wireless communication terminals in the packet communications every said carrier, and also allocates said first wireless communication terminal and said second wireless communication terminal in an alternate manner.

32. A wireless communication system as claimed in claim 19, wherein said packet communication is carried out by using a variable length packet.

33. A wireless communication system as claimed in claim 22 further comprising:
an allocating section for allocating frames which are used in packet communications by said first and second wireless communication terminals; and
a time slot distribution determining section for determining a time slot distribution in the frames which can be used by both said first wireless communication terminal and said second wireless communication terminal.

34. A wireless communication system as claimed in claim 33 wherein said allocating section allocates frames which are independently used in the packet communications by said first and second wireless communication terminals within the time slot distribution which can be used by said first wireless communication terminal and the time slot distribution which can be used by said second wireless communication terminal, both said time slot distributions being determined by said time slot distribution determining section.

35. A wireless communication system as claimed in claim 33 wherein said time slot distribution determining section determines the time slot distributions in the frames which can be used by said first wireless communication terminal and said second wireless communication terminal based upon a comparison result made between communication qualities of said first wireless communication terminal and communication qualities of said second wireless communication terminal.

36. A wireless communication system as claimed in claim 35 wherein said time slot distribution determining section determines the time slot distributions in the frames which can be used by said first wireless communication terminal and said second wireless communication terminal based upon a comparison result made between an average value of communication qualities of said first wireless communication terminal and an average value of communication qualities of said second wireless communication terminal.

37. A wireless communication system as claimed in claim 35 wherein said time slot distribution determining section determines the time slot distributions in the frames which can be used by said first wireless communication terminal and said second wireless communication terminal based upon a comparison result made between a maximum value of communication qualities of said first wireless communication terminal and a maximum value of communication qualities of said second wireless communication terminal.

38. A wireless communication system as claimed in claim 3 wherein said time slot distribution determining section determines the time slot distributions in the frames which can be used by said first wireless communication terminal and said second wireless communication terminal based upon a comparison result made between a total number of said first wireless communication terminals and also a total number of said second wireless communication terminals, which are connected to said base station.

39. A base station apparatus for performing a packet communication with respect to both a first wireless communication terminal for performing a packet communication by using a single carrier, and a second wireless communication terminal for performing a packet communication by using a plurality of carriers at the same time, said base station apparatus comprising:
  a storage section for storing allocation information, wherein the storage section sets and stores a first allocation information region for the first wireless communication terminal and a second allocation information region for the second wireless communication terminal;
  a first allocation section for at least one of allocating a carrier to said first wireless communication terminal and carriers to said second wireless communication terminal from a plurality of carriers, said allocated carrier or carriers to be used during communication with said base station; and
  a second allocation section for allocating allocation information of the one carrier set in the first allocation information region for said first wireless communication terminal, and for allocating allocation information of the plurality of carriers set in the second allocation information region for said second wireless communication terminal based on the availability of said allocation information; and
  wherein said allocation information is for identifying a wireless communication terminal communicating with said base station and wherein said allocation information is for identifying one carrier or a plurality of carriers.

40. A base station apparatus as claimed in claim 39, wherein said packet communication is carried out by using a variable length packet.

41. A base station apparatus as claimed in claim 39 wherein when said second wireless communication terminal performs the communication by using said plurality of carriers, said second allocation section allocates said single-carrier allocation information to said second wireless communication terminal in a case that said multi-carrier allocation information is unavailable.

42. A base station apparatus as claimed in claim 39 wherein said second allocation information applying section allocates said multi-carrier allocation information to said first wireless communication terminal in a case that said single-carrier allocation information is unavailable.

43. A base station apparatus as claimed in claim 39, further comprising:
  an allocating section for allocating frames which are used by the wireless communication terminals in packet communications, said allocating section allocates one wireless communication terminal among said first and second wireless communication terminals to one unit of the frames used by said first and second wireless communication terminals in the packet communications for said one carrier and each of said plurality of carriers.

44. A base station apparatus as claimed in claim 43, wherein said packet communication is carried out by using a variable length packet.

45. A base station apparatus as claimed in claim 39 further comprising:
  an allocating section for allocating frames which are used in packet communications by said first and second wireless communication terminals; and
  a time slot distribution determining section for determining a time slot distribution in the frames which can be used by both said first wireless communication terminal and said second wireless communication terminal.

46. A base station apparatus as claimed in claim 45 wherein said packet communication is carried out by using a variable length packet.

* * * * *